United States Patent
Mimura et al.

(10) Patent No.: US 12,515,520 B2
(45) Date of Patent: Jan. 6, 2026

(54) VEHICLE DISPLAY SYSTEM, VEHICLE DISPLAY METHOD, AND COMPUTER-READABLE NON-TRANSITORY STORAGE MEDIUM STORING VEHICLE DISPLAY PROGRAM

(71) Applicant: DENSO CORPORATION, Kariya (JP)

(72) Inventors: Hiroyuki Mimura, Kariya (JP); Kiyotaka Taguchi, Kariya (JP); Yasuhiko Joho, Kariya (JP); Toshinori Mizuno, Kariya (JP); Akira Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 18/487,998

(22) Filed: Oct. 16, 2023

(65) Prior Publication Data

US 2024/0042857 A1   Feb. 8, 2024

Related U.S. Application Data

(63) Continuation of application No. PCT/JP2022/015569, filed on Mar. 29, 2022.

(30) Foreign Application Priority Data

Apr. 23, 2021   (JP) .................................. 2021-073381

(51) Int. Cl.
*B60K 35/00*   (2024.01)
*B60K 35/60*   (2024.01)
(Continued)

(52) U.S. Cl.
CPC .............. *B60K 35/00* (2013.01); *B60K 35/60* (2024.01); *B60K 35/22* (2024.01); *B60K 35/285* (2024.01);
(Continued)

(58) Field of Classification Search
CPC .................... B60K 35/00; B60K 35/60; B60K 2360/1868; B60K 35/29; B60K 35/285; B60K 2360/182; B60K 35/22
See application file for complete search history.

(56) References Cited

U.S. PATENT DOCUMENTS 10,857,942 B2 * 12/2020 Oba ........................... G06T 3/00
2013/0021326 A1 *  1/2013 Tsai ..................... H04N 13/356
                                                              345/82

(Continued)

FOREIGN PATENT DOCUMENTS

EP           2168815 B1 *  6/2014   ............. G08G 1/167
JP           H02244880 A      9/1990
(Continued)

*Primary Examiner* — Chico A Foxx
(74) *Attorney, Agent, or Firm* — Harness, Dickey & Pierce, P.L.C.

(57) ABSTRACT

By vehicle display system, a vehicle display method, or a computer-readable non-transitory storage medium storing a vehicle display program configured to display content on a plurality of displays sandwiching a non-display region, a head position of an occupant of a vehicle, an angle of a head of the occupant, and a line of sight are detected, a hiding prevention process is executed on important information, and the important information is displayed on a display screen.

19 Claims, 24 Drawing Sheets

(51) Int. Cl.
*B60K 37/02* (2006.01)
*B60K 35/22* (2024.01)
*B60K 35/28* (2024.01)
*B60K 35/29* (2024.01)

(52) U.S. Cl.
CPC ........ *B60K 35/29* (2024.01); *B60K 2360/182* (2024.01); *B60K 2360/1868* (2024.01)

(56) References Cited

U.S. PATENT DOCUMENTS

| | | | | |
|---|---|---|---|---|
| 2015/0314682 | A1* | 11/2015 | Enriquez Ortiz | G02B 30/30 701/49 |
| 2017/0054970 | A1* | 2/2017 | Singh | B60K 35/00 |
| 2018/0260613 | A1* | 9/2018 | Gao | G06T 7/37 |
| 2019/0197327 | A1* | 6/2019 | Mangla | B60R 1/28 |
| 2019/0248288 | A1* | 8/2019 | Oba | B60R 1/26 |
| 2020/0171950 | A1* | 6/2020 | Wieczorek | B60N 2/90 |
| 2021/0291736 | A1* | 9/2021 | Higashiyama | G02B 27/0093 |
| 2022/0073092 | A1* | 3/2022 | Yuasa | G08G 1/0133 |
| 2022/0189301 | A1* | 6/2022 | Nakazawa | G08G 1/09626 |
| 2022/0230456 | A1* | 7/2022 | Kasarla | G06V 20/593 |
| 2022/0277673 | A1* | 9/2022 | Iwasaki | B60K 35/10 |
| 2022/0402433 | A1* | 12/2022 | Li | G06T 7/80 |
| 2023/0311652 | A1* | 10/2023 | Salter | B60W 40/08 701/36 |
| 2024/0043013 | A1* | 2/2024 | Kim | B60W 40/08 |
| 2025/0103134 | A1* | 3/2025 | Watanabe | B60K 35/235 |
| 2025/0111810 | A1* | 4/2025 | Tavger | B60K 35/10 |

FOREIGN PATENT DOCUMENTS

| | | | |
|---|---|---|---|
| JP | 2009288839 A | 12/2009 | |
| JP | 2020079879 A | 5/2020 | |
| WO | WO-2023199896 A1 * | 10/2023 | ............ B60K 35/81 |

* cited by examiner

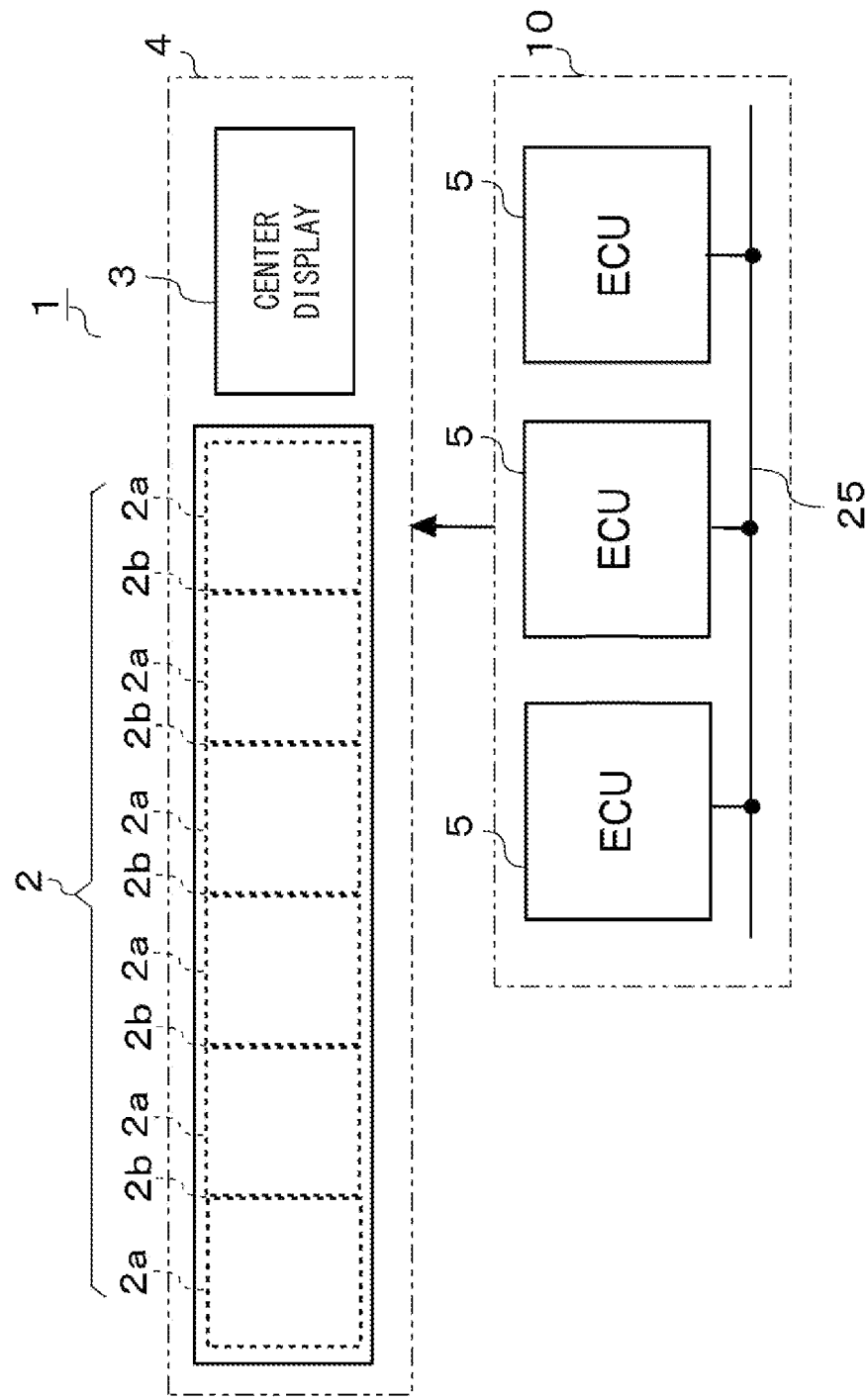

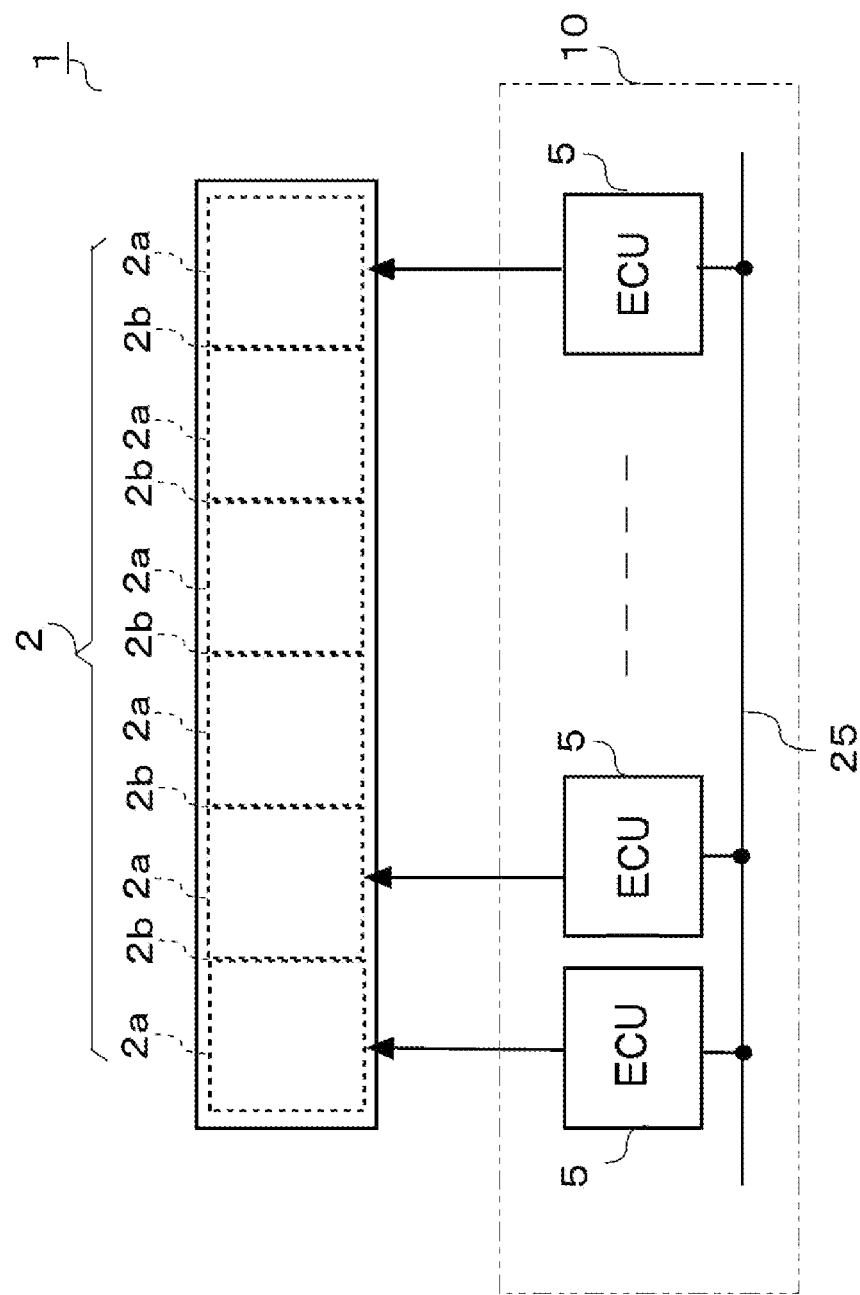

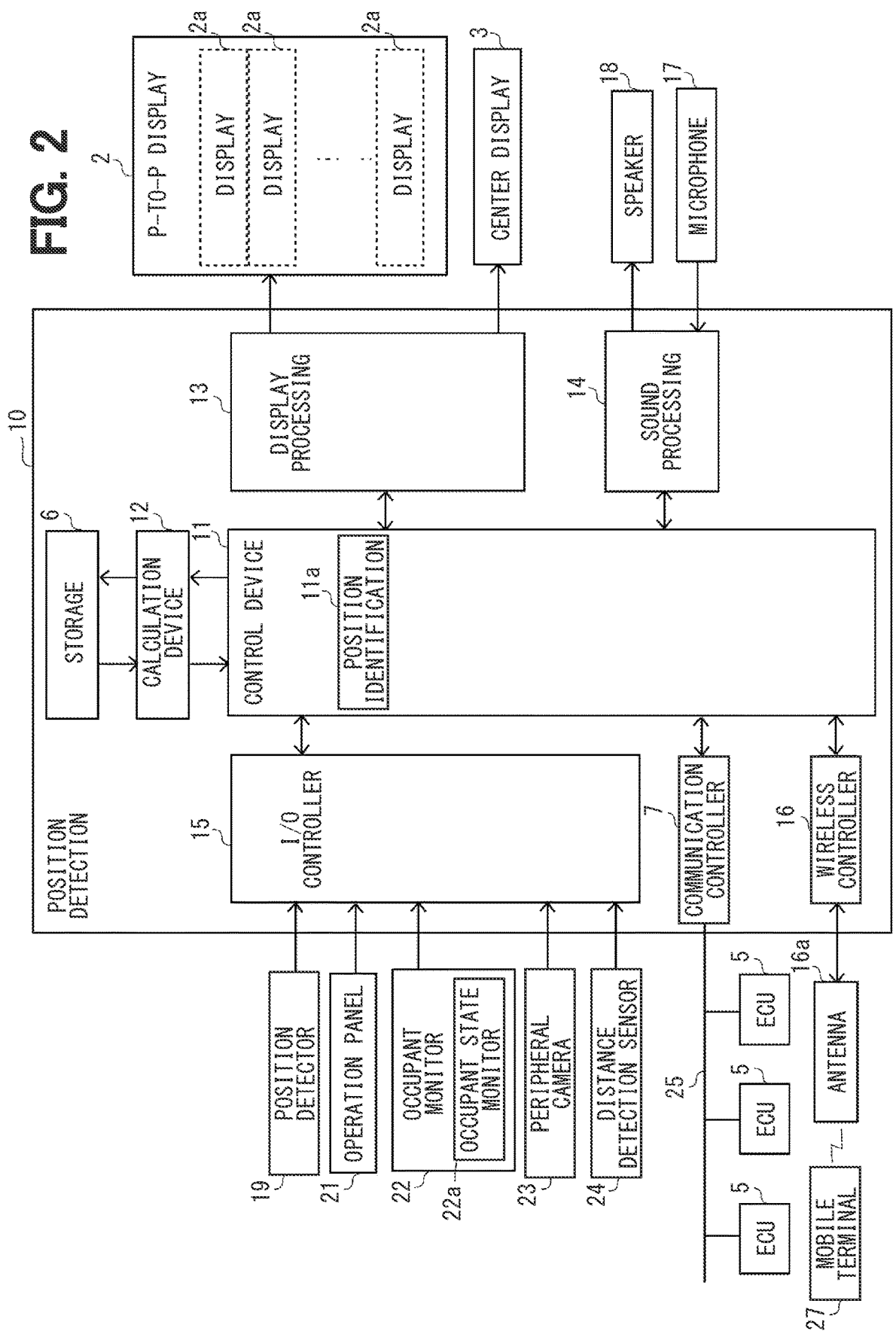

VEHICLE DISPLAY SYSTEM, VEHICLE DISPLAY METHOD, AND COMPUTER-READABLE NON-TRANSITORY STORAGE MEDIUM STORING VEHICLE DISPLAY PROGRAM

CROSS REFERENCE TO RELATED APPLICATIONS

The present application is a continuation application of International Patent Application No. PCT/JP2022/015569 filed on Mar. 29, 2022, which designated the U.S. and claims the benefit of priority from Japanese Patent Application No. 2021-073381 filed on Apr. 23, 2021. The entire disclosures of all of the above applications are incorporated herein by reference.

TECHNICAL FIELD

The present disclosure relates to a vehicle display system, a vehicle display method, and a computer-readable non-transitory storage medium storing a vehicle display program.

BACKGROUND

Conventionally, in a cockpit system, a plurality of displays such as a meter display, a center display, and a head-up display are installed on an instrument panel to display various information such as meter images, multimedia images, and driving assistance information. In recent years, it has been desired to increase the size of the display installed in the vehicle. However, in many cases, a plurality of medium-sized displays are installed and adjoining. This is because the cost can be reduced compared to installing one large display. Until now, there has been provided a technology for constructing a cockpit system in which a plurality of displays are installed side by side in a vehicle.

In a display system including the plurality of adjoining displays, at the edge of each display, there is a non-display region where the display cannot be performed. Therefore, when a single picture or moving image is displayed, continuity may not be maintained due to the non-display region. Thereby, an uncomfortable feeling may occur. In a known technology, when displaying content across multiple displays, the display size is not distorted in consideration of the non-display region, and the display position of the content is adjusted according to the line of sight of an occupant and the eye level. Thereby, the continuity is maintained. However, in this technology, important content may not be displayed depending on the display position of the content and the relative positional relationship between the display position and the occupant.

According to a technology of a comparative example, a display effect determination unit continuously displays contents toward target coordinates, thereby determining a direction in line with an actual position of an information processing devices in a GUI movement between the information processing devices across screens. disclosed.

SUMMARY

By vehicle display system, a vehicle display method, or a computer-readable non-transitory storage medium storing a vehicle display program configured to display content on a plurality of displays sandwiching a non-display region, a head position of an occupant of a vehicle, an angle of a head of the occupant, and a line of sight are detected, a hiding prevention process is executed on important information, and the important information is displayed on a display screen.

BRIEF DESCRIPTION OF DRAWINGS

The above and other features and advantages of the present disclosure will become more apparent from the following detailed description made with reference to the accompanying drawings.

FIG. 1B is a first diagram showing a configuration of a P-to-P display and a control image.

FIG. 1C is a second diagram showing a configuration of the P-to-P display and the control image.

FIG. 2 is a block diagram schematically showing a vehicle display system.

DETAILED DESCRIPTION

The present disclosure provides a vehicle display system, a vehicle display method, and a vehicle display program capable of accurately displaying information to an occupant while maintaining a continuity of content between display screens of a plurality of displays as much as possible.

According to one example, a plurality of displays display sandwich a non-display region and display content. An occupant state monitor detects a head position of an occupant of a vehicle, an angle of a head of the occupant, and a line of sight of the occupant. A display processor executes, based on a detection result of the occupant state monitor, a hiding prevention process on important information under a condition that the content to be displayed on at least one of the plurality of displays includes the important information, and displays the important information on a display screen of the at least one of the plurality of displays.

According to one example, it determined whether the important information is included in the content, and the important information is displayed on at least one of the display screens of the plurality of displays after the hiding prevention process. Therefore, it is possible to accurately display information to the occupant while maintaining the continuity of the content between the display screens of the plurality of displays as much as possible.

Hereinafter, some embodiments related to a vehicle display system 1 will be described with reference to the drawings.

First Embodiment

Figure 1A:
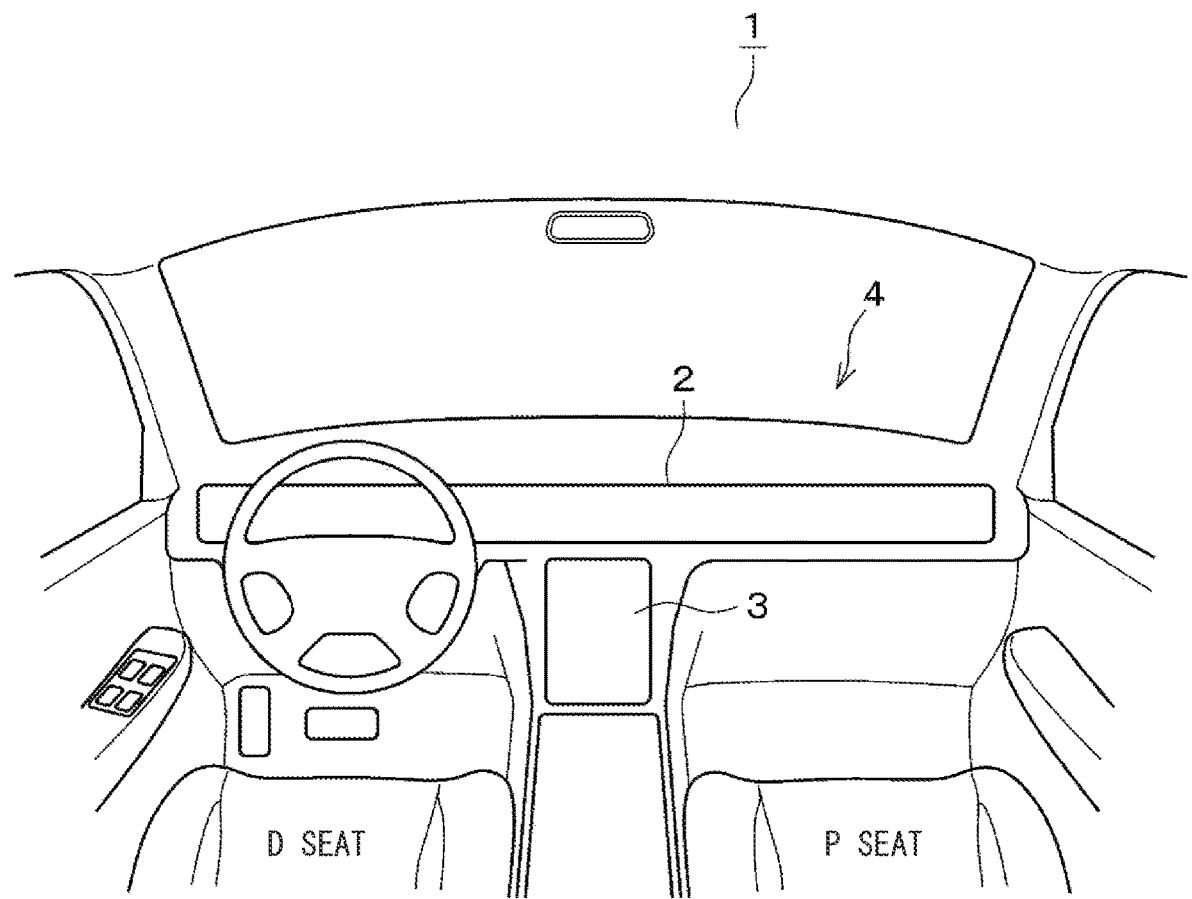
FIG. 1A is an appearance configuration diagram of a cockpit system according to a first embodiment.

A first embodiment will be described with reference to FIGS. 1A to 12. As shown in FIGS. 1A and 1B, the vehicle display system 1 includes a cockpit system 4 including a plurality of display devices such as a pillar-to-pillar display 2 and a center display 3. However, the number, the arrangement, or the configuration of the display devices is merely an example, and the disclosure is not limited thereto. Hereinafter, the pillar-to-pillar display 2 is also referred to as a P-to-P display 2.

As shown in FIGS. 1A and 1B, the P-to-P display 2 is configured such that a plurality of displays 2a are arranged side by side to become horizontally long. Each display 2a of the P-to-P display 2 has a liquid crystal display, an organic EL display or the like, and is a large display provided on a dashboard between the left pillar and the right pillar of the vehicle. The P-to-P display 2 can display various image contents such as meter images, images captured by a peripheral camera 23, entertainment images such as still images and moving images, and map images in the peripheral of a current position in full graphic display.

The center display 3 has, for example, a liquid crystal display or an organic EL display, and, as shown in FIG. 1A, is installed below the P-to-P display 2 between the driver seat and the passenger seat. The center display 3 is provided in the vicinity of a center console so that both the driver and the occupant in the front seats can easily view it, and can display various contents. An operation panel 21 is formed on the center display 3, and it is possible to select contents to be displayed on the P-to-P display 2, operate air conditioning, operate audio, and perform input operations for navigation functions.

The P-to-P display 2 is vertically arranged with the center display 3 and is spaced apart from the center display 3. When two screens are installed in the vertical direction, it is possible to increase the display region that can be visually recognized by the occupant at one time. The expression of "visually recognize" may be also referred to as an expression of "view". Further, in the cockpit system 4, the display screen of each display 2a of the P-to-P display 2 is installed so as to be positioned further outward than the display screen of the center display 3. Each display 2a of the P-to-P display 2 has a black belt-like frame 2b on its outer frame. Since the frame 2b is provided so as to surround the display screen, it becomes a non-display region.

Further, as shown in FIGS. 1B and 2, a large number of ECUs 5 are configured in the vehicle and connected to a vehicle interior network 25. The ECU 5 includes a display system ECU, a periphery monitoring system ECU, a drive control system ECU, and a DCM that communicates with the outside of the vehicle. The DCM is the abbreviation for data communication module. The travel control system ECU includes a well-known vehicle control ECU, an engine control ECU, a motor control ECU, a brake control ECU, a steering control ECU, an integrated control ECU, and the like. The travel control system ECU includes an automated driving ECU. The automated driving ECU is also referred to as an autonomous driving ECU (electric control unit).

When the automated driving ECU receives an automatic control signal, it drives driving actuators to execute corresponding predetermined levels of driving assistance and automated driving. For example, the driving assistance with level 1 includes an automated braking operation to avoid collisions with obstacles, a follow-up driving operation that follows the preceding vehicle, and a lane-departure prevention driving operation that controls the vehicle so that it does not stray from the lanes on both sides. The automated driving with level II can use the driving assistance with level I, and execute an automated driving mode that causes the vehicle to perform automated driving under specific conditions, automatically pass over a slow vehicle when the slow vehicle exists in an expressway, for example, and causes the vehicle to automatically merge onto or come out the road in the expressway. Here, in the automated driving with level II, the driver is obliged to monitor the automated driving operation. In the automated driving with level III and above, the system performs all driving tasks while being monitored by the system.

Each ECU 5 mainly includes a microcomputer having a processor, various storages 6 such as a cache memory, a RAM, and a ROM, an I/O interface, and a bus connecting them. Each ECU 5 is communicably connected to other ECUs 5 provided in the vehicle through the communication controller 7 and the vehicle interior network 25.

In this embodiment, as shown in FIG. 1B, a plurality of display system ECUs 5 constitute an HCU as an information processing device 10. The display system ECU 5 shares the processing capacity of its internal physical resources and executes a display process on the displays 2, 3, and the like. For example, as illustrated in FIG. 1C, each ECU 5 executes the display process on the display 2a of the P-to-P display 2. The HCU is an abbreviation for human machine interface control unit. Although also the vehicle interior network 25 is connected also between the plurality of display system ECUs 5 is described, the connection may be made by a dedicated line. The storage 6 is a non-transitory tangible storage medium for non-transitory storage of computer readable programs and data. The non-transitory tangible storage medium is implemented by a semiconductor memory or the like.

As shown in FIG. 2, the information processing device 10 includes a control device 11, a calculation device 12, a storage 6, a display processing unit 13, a sound processing unit 14, an I/O control unit 15 that manages input or output from various devices, a communication controller 7 for managing communication with another ECU 5, and a wireless controller 16 configured by connecting an antenna 16a to enable wireless connection with another mobile terminal 27 by wireless LAN or Bluetooth (registered trademark). The display processing unit 13 may be also referred to as a display processor 13. Here, an embodiment, in which output signals of the main components such as a position detection unit 19, the operation panel 21, an occupant monitor 22, the peripheral camera 23, and a distance detection sensor 24 shown in FIG. 2 are input to the information process device 10 via the I/O controller 15, will be described. However, the signals may be input from other ECUs 5 such as a periphery monitoring system ECU and a travel control system ECU via the vehicle interior network 25.

The wireless controller 16 establishes a communication link with a mobile terminal 27 carried by a vehicle occupant. The information processing device 10 waits for an incoming call to the mobile terminal 27, and when the mobile terminal 27 receives the incoming call from the other party and answer the incoming call, the information processing device 10 communicates with the other party through the speaker 18 and the microphone 17 via the mobile terminal 27. Further, the information processing device 10 can recognize voice input through the microphone 17.

The calculation device 12 calculates the display region for displaying, on the display screen of the display 2, 3, a content such as images, sentences, characters, or symbols (hereinafter referred to as images and the like) stored in storage 6 based on the control of the control device 11, calculates in which region of the display screens of the displays 2 and 3 the content such as the image and the like is to be displayed, and in which region the image and the like is to be overlapped and displayed as a 2D layer, and outputs the display region together with the content such as an image to the control device 11. The symbol here is a general term for not only the original meaning symbol, but also the content such as traffic signs that are represented by icons. Specifically, the symbol indicates the information other than the image, the sentence and the character to be displayed on the displays 2, 3 according to the navigation function.

The display processing unit 13 executes the display process of the content such as the image and the like in the above-described display regions in the display screens of the displays 2 and 3 under the control of the control device 11. Thereby, on the display screens of the displays 2 and 3, the contents such as images can be overlapped and displayed for each display layer.

Under the control of the control device 11, the sound processing unit 14 receives a reception voice input from the microphone 17 and outputs a transmission voice from the speaker 18. When the sentence content and the character content are input from the control device 11, the sound processing unit 14 converts them into voice, reads them out through the speaker 18, and outputs them.

A position detection unit 19 detects a position with high accuracy using a well-known GNSS receiver such as GPS (not shown) and an inertial sensor such as an acceleration sensor or a gyro sensor. The position detection unit 19 outputs a position detection signal to the control device 11 through the I/O control unit 15. The position identification unit 11a of the control device 11 implements a function as an ADAS locator that sequentially measures the current position of the vehicle with high accuracy based on the map information input from the map data input device and the position detection signal of the position detection unit 19. The ADAS is an abbreviation for advanced driver assistance systems. The vehicle position is represented in a coordinate system using latitude and longitude. In this coordinate system, for example, x-axis indicates longitude and y-axis indicates latitude It should be noted that the specifying of the vehicle position may be executed in various manners in addition to the above-described method. For example, the position of the vehicle may be specified based on travelling distance information obtained from the detection result by a vehicle speed sensor mounted on the subject vehicle. The control device 11 can perform a so-called navigation process based on the current position of the subject vehicle.

The operation panel 21 is a touch panel configured on a predetermined display, for example, the display 3, and the I/O control unit 15 receives an operation input from the occupant and outputs the operation input to the control device 11. The control device 11 executes control based on operation signals from the operation panel 21.

The occupant monitor 22 detects the state of the occupant in the vehicle or the operation state. The occupant monitor 22 is configured using, for example, a power switch, an occupant state monitor 22a, a turn switch, an autonomous control switch, and the like, and outputs various signals to the control device 11. The occupant monitor 22 may include a steering sensor that detects whether the steering wheel is being gripped or steered by the driver, a seating sensor that detects whether the driver is seated, an accelerator pedal or brake pedal depression sensor, and the like.

The power switch is turned on by a user in the vehicle compartment in order to start the internal combustion engine or the electric motor, and outputs a signal corresponding to the operation. The occupant state monitor includes a camera that detects the state of the occupant in the D seat or the P seat by capturing the state of the occupant with an image sensor and outputs an image signal. The occupant state monitor 22a of the driver is called DSM. The DSM is an abbreviation for driver status monitor. The occupant state monitor 22a obtains an image signal obtained by irradiating the face of the driver with near-infrared light and capturing an image, analyzes the image as necessary, and outputs the signal to the control device 11. The occupant state monitor 22a is used to detect the state of the occupant user such as the driver, especially during the driving assistance operation or the automated driving operation. A turn switch is turned on by an occupant in the vehicle compartment to activate a direction indicator of the vehicle, and outputs a turn signal for turning right or left according to the operation.

The automatic control switch outputs an automatic control signal in response to the occupant operation when the occupant in the vehicle compartment executes an on-operation in order to command an autonomous control of the driving state of the vehicle. The control device 11 can determine the behavior of the occupant of the vehicle, for example, a direction in which the line of sight is directed, based on the signal from the occupant monitor 22. Further, the control device 11 can also input the operation state of the power switch, the operation state of the direction indicator, the command information of the automatic control of the vehicle, and the like.

The peripheral camera 23 constitutes a periphery monitor sensor such as a front camera that images the front of the vehicle, a back camera that images the rear of the vehicle, a corner camera that images the front side and the rear side of the vehicle, a side camera that images the side of the vehicle, and an electronic mirror. These sensors output each image signal of the front guide monitor, the back guide monitor, the corner view monitor, the side guide monitor, and the electronic mirror to the control device 11 through the I/O control unit 15, to store as respective captured signals in the storage 6.

The distance detection sensor 24 for detecting the distance to an obstacle is installed in the vehicle as a periphery monitor sensor. The distance detection sensor 24 includes a clearance sonar, a LiDAR, a millimeter wave radar, and the like, and detects vehicles, people, animals, fallen objects on the road, guardrails, curbs, trees, and the like approaching near the front of the vehicle, the front side of the vehicle, the rear side of the vehicle, the rear of the vehicle, or the side of the vehicle. It can also detect the azimuth to the obstacle and the distance to the obstacle. In addition, with the above-mentioned periphery monitor sensor, it is possible to detect road markings such as traffic lane markings, stop lines, and pedestrian crossings painted on the road around the subject vehicle, traffic signs such as a "stop" sign painted on the road, and a stop line painted at a boundary of an intersection.

Figure 3:
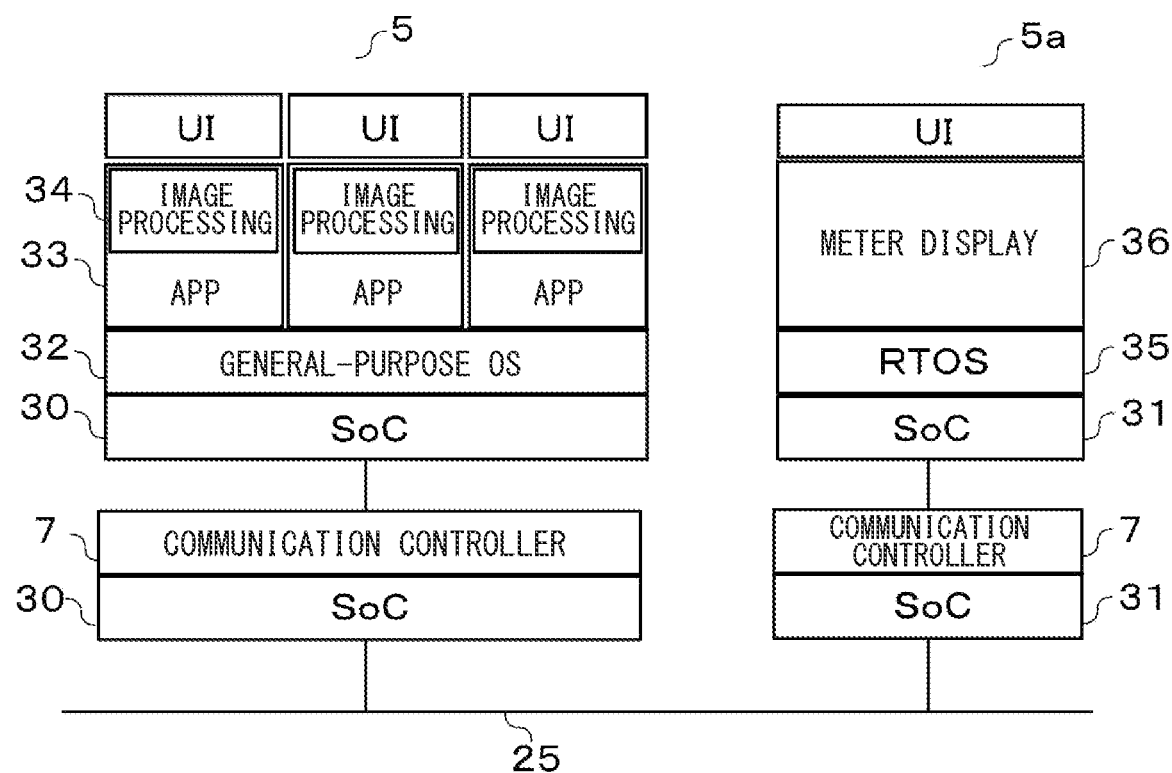
FIG. 3 is a configuration diagram schematically showing hardware and software.

FIG. 3 shows an example of the hardware and software configuration of the information processing device 10. SoCs 30 and 31 are mounted on ECUs 5 and 5a, respectively, and the above-described microcomputers are equipped in the mounted SoCs 30 and 31, respectively. The microcomputers equipped in the SoCs 30 and 31 of the ECU 5 are configured to operate various applications 33 (hereinafter abbreviated as apps 33) on a pre-installed general-purpose OS 32, such as Linux OS (Linux is a registered trademark). The SoC is an abbreviation for System On Chip.

The app 33 includes an image processing app 34 and other applications. A processor installed in the SoC 30 executes a drawing process on the display screen of each display 2a of the P-to-P display 2 in response to a drawing request from the image processing app 34.

On the other hand, since the ECU 5a is provided for drawing a meter, the reference numeral of 5a is attached. On the microcomputer equipped in the SoC 31 of the ECU 5a, a real-time OS 35 capable of processing with higher real-time performance than the general-purpose OS 32 is installed, and a meter app 36 is operated on the real-time OS 35. The following description may focus on the apps 33 such as the image processing app 34 and the meter app 36.

The meter app 36 notifies the user of vehicle speed, number of rotations, warnings, and the like. An image content to be displayed in a specific display region of the P-to-P display 2 is drawn. For example, the meter app 36 draws the image content such as a speedometer, a tachometer, a shift range position, or a warning light. The speedometer includes a speed image whose display needs to be updated in real time to show changes in the speed of the vehicle. Similarly, the tachometer is also included in the meter image, as the display needs to be updated in real time to show changes in the number of rotations.

A content to be drawn by the meter app 36 can also be displayed on another display, for example, the center display 3. The content to be drawn by the meter app 36 is required to have relatively more real-time performance than the content drawn by other applications.

The app 33 includes a navigation app and the like. The navigation app implements a navigation function and mainly shows image contents such as a navigation screen including a map, a current position of the vehicle on the P-to-P display 2 or the center display 3.

Further, the app 33 also includes an image synthesizing application. The image synthesizing application is an application for specifying sizes and types of various image contents to be displayed on the display device, synthesizing images of the image contents in one frame, and outputting the synthesized mixed image on the P-to-P display 2 and the center display 3. The image synthesizing application implements a function as an image synthesizing unit, also called a compositor, and a function as an image output unit.

Among the apps 33 and 36, the application that draws the image content is assigned a display layer for drawing the image content. These display layers are secured on the storage 6 in a size capable of drawing necessary image contents.

Also, the image content to be displayed on the P-to-P display 2 and the center display 3 can be animated. Here, the animation operation is a display aspect in which a position and a size of an image indicating the content gradually change, the image rotates, the user interface moves as a whole along with a swipe operation, the image gradually fades in or fades out, the color of the image changes, and the like.

The control device 11 shown in FIG. 2 executes various apps 33 and 36 stored in the storage 6 to execute various processes based on the detection results of the occupant monitor 22, especially the occupant state monitor 22a. The display processing unit 13 changes the display position of the image content to be displayed on the displays 2 and 3 based on the detection result of the occupant state monitor 22a, or changes the image content.

By executing the app 33, the display processing unit 13 expresses an image A such as a real image or a virtual image in a virtual space K1 defined by virtual coordinates, and displays an image with a 2D expression or a 3D expression on the display screen of the P-to-P display 2. The image A is shown to an occupant by projecting the image A two-dimensionally or three-dimensionally. At this time, the P-to-P display 2, including its display screen and the frame 2b surrounding the display screen, appears to be located between the virtual space K1 and the real space K2 in which the vehicle occupant exists.

The operation and the action of the above configuration will be described with reference to FIG. 4 and subsequent drawings. The information processing device 10 causes the display processing unit 13 to display various contents on the P-to-P display 2, the center display 3, and the like. However, at this time, the information process device 10 may cause each display 2a of the P-to-P display 2 to execute the display process of the single content and cause the center display 3 to execute the display process of the single content. Further, the information process device 10 may cause the display processing unit 13 to display the content such as the integrated image on the display screens of the plurality of displays 2a.

When the information processing device 10 displays the integrated content across the display screens of the plurality of displays 2a, the occupant of the vehicle can confirm the black frame 2b between the plurality of displays 2a. At this time, continuous images or sentences cannot be displayed, the discontinuous display occurs. As the result, the continuity of the display is not maintained. Therefore, the information process device 10 preferably executes the process shown in FIG. 4 to display the content hidden in the frame 2b on any of the displays 2a so that the occupant can see the content.

Figure 4:
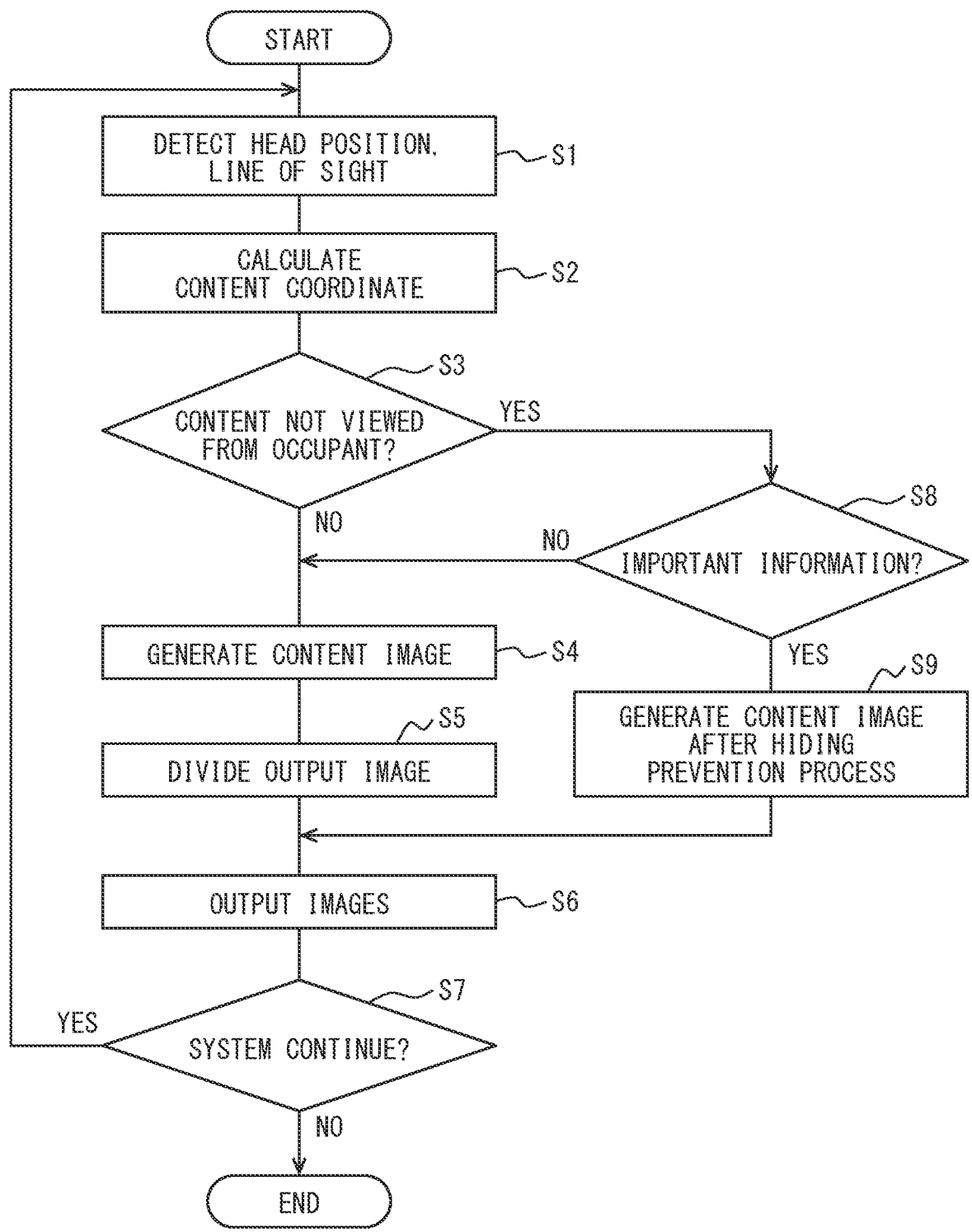
FIG. 4 is a flowchart schematically showing process contents.

The control device 11 detects the head position and angle of the vehicle occupant and the line of sight of the occupant using the occupant state monitor 22a in S1 of FIG. 4. At this time, the occupant state monitor 22a causes the storage 6 to store a captured signal obtained by capturing the body of an occupant such as a driver, for example, through the I/O control unit 15. The calculation device 12 analyzes the captured image to detect the position of the head part of the body and the positions of facial parts such as the eyes in the captured image, and determines the position of the occupant's head, its angle, and the direction of the line of sight. The technology of image analysis of the occupant's head position, its angle, and the direction of the line of sight may be installed in the occupant state monitor 22a.

Next to or in parallel with S1, the calculation device 12 calculates the coordinates of the display region for displaying the content on the displays 2 and 3 in S2. Here, it is calculated which coordinate plane or coordinate space in the virtual space K1 shown in FIG. 6 should be displayed. When the calculation device 12 passes the result of calculating the coordinates to be displayed on the plurality of displays 2a to the control device 11, the control device 11 determines in S3 whether the content can be viewed by the occupant, for example, the driver, based on the occupant's head position, its angle, and the direction of the line of sight calculated in S1, and the regions that is calculated in S2 and to be displayed on the plurality of displays 2a.

When the control device 11 determines that all the content can be seen by the occupant, the determination is NO in S3, and the display processing unit 13 directly generates an image of the content in S4. Then, the display processing unit 13 divides the output image to be displayed on the plurality of displays 2a to generate a plurality of images in S5, and outputs the images to the plurality of displays 2a in S6. Thereby, the plurality of displays 2a can display corresponding contents. For example, when different contents such as a map display screen, an image captured by the peripheral camera 23, and an entertainment image are displayed on each display 2a, the processes are executed in the order of S3, S4, S5, and S6.

The control device 11 determines whether to continue as a system by determining whether it is necessary to determine whether to change the content display position using the occupant state monitor 22a in S7. If necessary, the control device 11 continues the system and returns to S1 to repeat the process.

Conversely, when it is determined in S3 that the content cannot be seen by the occupant, the determination is YES in S3, and the control device 11 determines whether the content is important information J in S8. In particular, when it is determined that the content cannot be seen by the occupant, mainly, the continuous content is displayed over the plurality of displays 2a.

As described later, when the driver parks the vehicle in a parking space Sp located behind the subject vehicle, the display processing unit 13 may display an image captured by a back guide camera over the plurality of displays 2a so that the driver can check the region behind the subject vehicle at a wide angle. In this case, the control device 11 determines whether the content determined as the important information J is hidden in the frame 2b when the content is viewed by the occupant, thereby determining whether the conditions of S3 and S8 are satisfied.

When the control device 11 determines that the content is not the important information J, the determination is NO in S8. The control device 11 repeats the processes of S4 to S7. That is, when the content is not the important information J, the display processing unit 13 displays the content in the display regions of the displays 2 and 3 as it is.

Conversely, when the content is the important information J, the display processing unit 13 executes a hiding prevention process in S9, divides the image content to be displayed on each of the plurality of displays 2a to generate a plurality of images, and outputs the plurality of images to the respective displays 2a in S6. Thereby, it is possible to display the important information J on any of the plurality of displays 2a. After that, the control device 11 repeats the processes from S1 through S7 as necessary.

Figure 5:
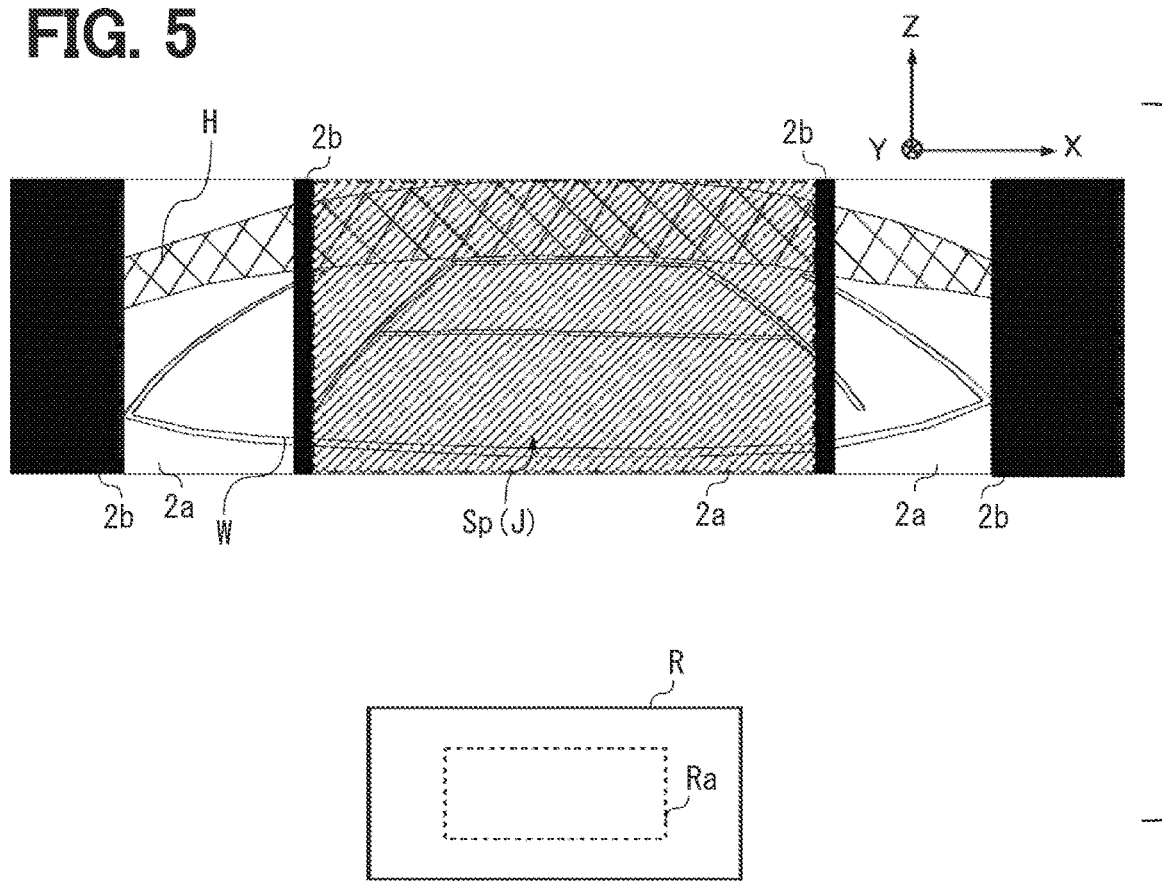
FIG. 5 is a first screen example shown on a plurality of displays.

A detailed description will be given below with examples. FIG. 5 shows an example in which the driver parks the subject vehicle inside an arbitrary parking space Sp while checking a frame line W drawn in the public parking lot and a wall H existing behind the subject vehicle. A hatched region in FIG. 5 indicates an region determined as the important information J by the control device 11 in S8 of FIG. 4. The display processing unit 13 extracts the captured image of a center partial region Ra from the captured image of an entire content region R stored in the storage 6, and calculates the coordinates of the virtual space K1 in which the content is displayed in S2 of FIG. 4. Then, the display processing unit 13 divides the captured image of the extracted region Ra and displays it on each display 2a of the P-to-P display 2.

The P-to-P display 2 is positioned between the virtual space K1 and the real space K2 in which the vehicle occupant exists. The control device 11 determines the head position and line of sight of the occupant using the occupant state monitor 22a by the calculation device 12, and recognizes the frame line W surrounding the parking space Sp in the image of the region Ra, thereby determining the parking space Sp surrounded by the frame line W as the important information J.

When the occupant sees the important information J, in S3 and S8, the control device 11 determines that the important information J can be displayed by only one display 2a and is not hidden in the frame 2b. Then, the determination is NO in S8 of FIG. 4. The display processing unit 13 generates image content so as to project the coordinates of the virtual space K1 onto the display screen of each display 2a in S4 of FIG. 4, divides the image, and outputs a plurality of images to each display 2a in S5.

Figure 6:
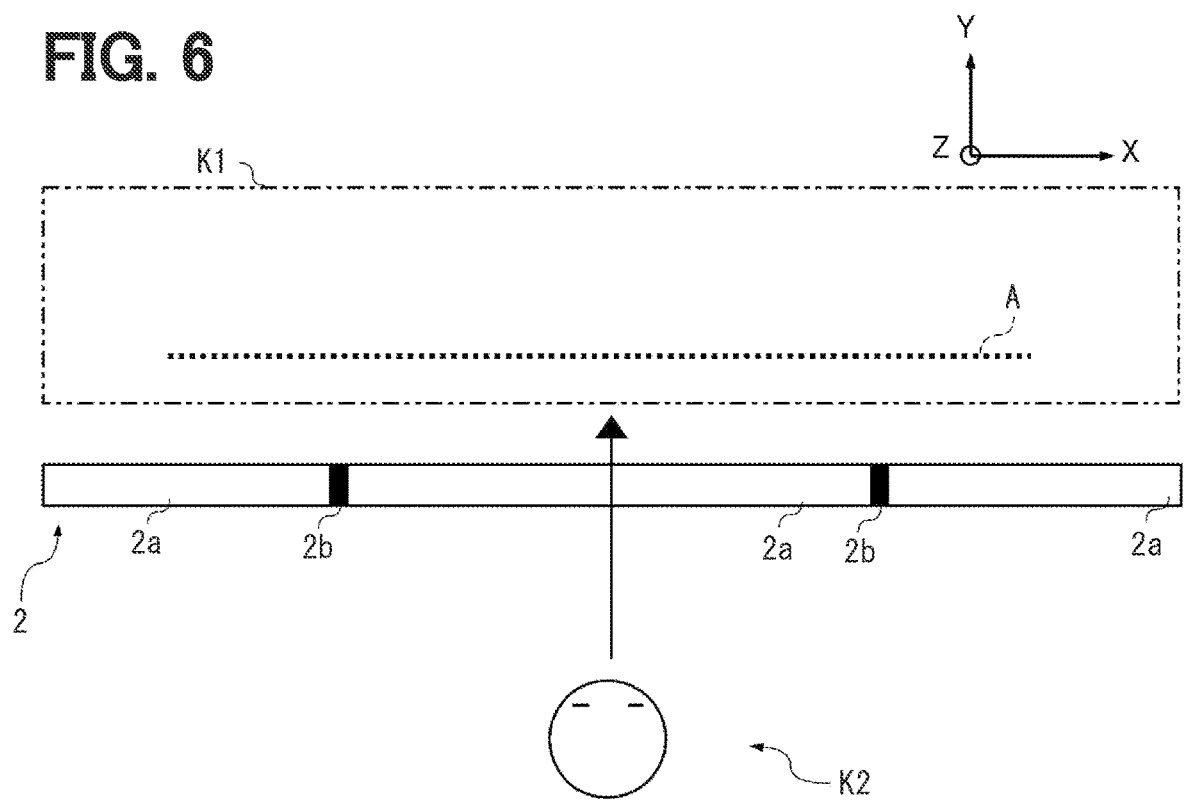
FIG. 6 is a first diagram showing a relationship between a virtual space drawn according to an application request and an actual space.
Figure 7:
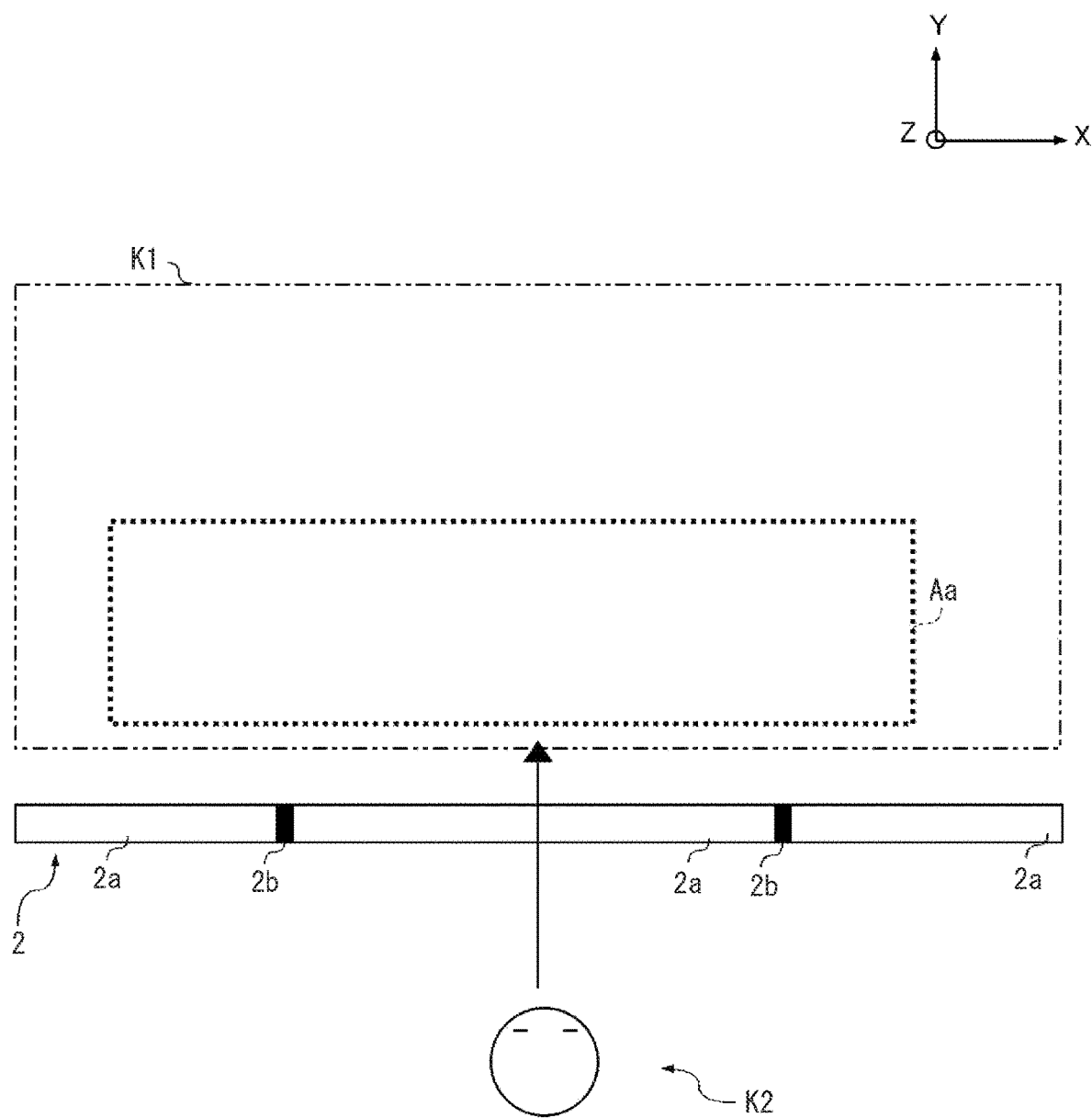
FIG. 7 is a second diagram showing a relationship between the virtual space and the actual space.

As shown in FIG. 6, in the virtual space K1 defined by the virtual coordinates, the display processing unit 13 shows the captured image of the extracted region Ra on plane coordinates parallel to the actual display screen of the P-to-P display 2, that is, coordinates on a plane parallel to the XZ plane in FIG. 6. Thereby, an image captured by the back guide camera is displayed as an image A in 2D expression. Here, an example in which the image A is displayed two-dimensionally as the 2D expression is shown. However, the present disclosure is not limited to this. As shown in FIG. 7 as an image diagram of the XY plane in the virtual space K1, for example, a plurality of cameras may be used to stereoscopically synthesize captured information, and a 3D-expressed stereoscopic image Aa may be projected in the virtual space K1 using a drawing technique using polygons.

Thereby, the occupant can confirm the image A in the 2D expression or the image Aa in the 3D expression. As described above, the important information J is displayed on the single display 2a without being divided by the frames 2b, so that the occupant can easily confirm the important information J.

A case where, after the confirmation, the driver tilts the head to the left and checks the display 2a will be described with reference to FIG. 8 and subsequent drawings. The control device 11 detects the movement of the head position, the change in the angle of the head position, and the movement of the line of sight of the occupant by using the occupant state monitor 22a. When the control device 11 determines in S3 and S8 of FIG. 4 that the content serving as the important information J cannot be seen by the occupant based on the information detected by the occupant state monitor 22a, in S9 of FIG. 4, the image content obtained after the hiding prevention process is generated.

Figure 8:
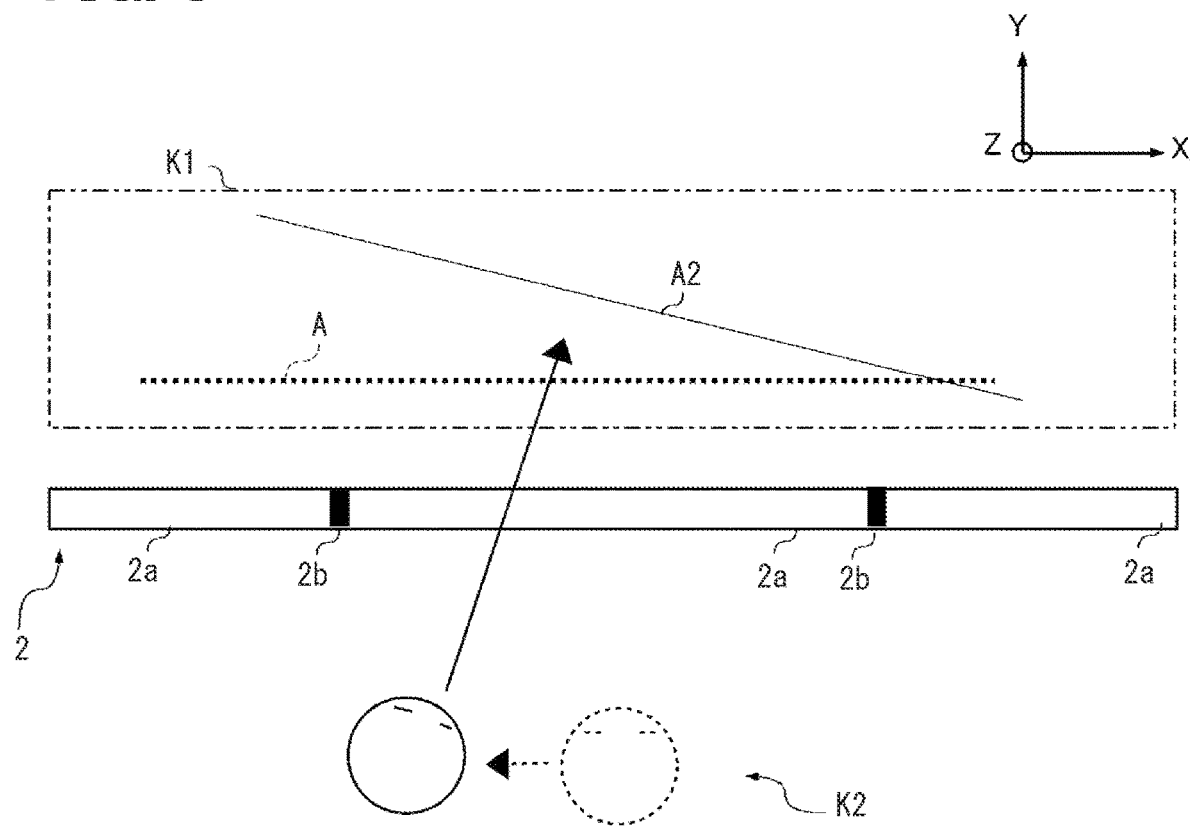
FIG. 8 is a third diagram showing the relationship between the virtual space and the actual space.

Specifically, the display processing unit 13 transforms the coordinates of the above-described reference image A in the virtual space K1, and draws it while tilting it in the virtual space K1 as shown in FIG. 8. As shown in the specific examples of FIGS. 8 and 9, the display processing unit 13 draws the relationship between the line of sight of the driver and the image A2 after the coordinate transformation so as to be orthogonal in the virtual space K1, for example. Thereby, the drawn image A2 can be expressed so as to match the line of sight of the driver. In this way, the display processing unit 13 expresses the image content in 3D so that the important information J can be displayed on the single display 2a. Thereby, the occupant can easily view the important information J. The example of drawing the 2D expression image A in 3D has been shown. However, as shown in FIG. 10, the similar effect can be obtained for the polygonal 3D expression image Aa by drawing the 3D image Aa2 by tilting it in the virtual space K1.

Figure 11:
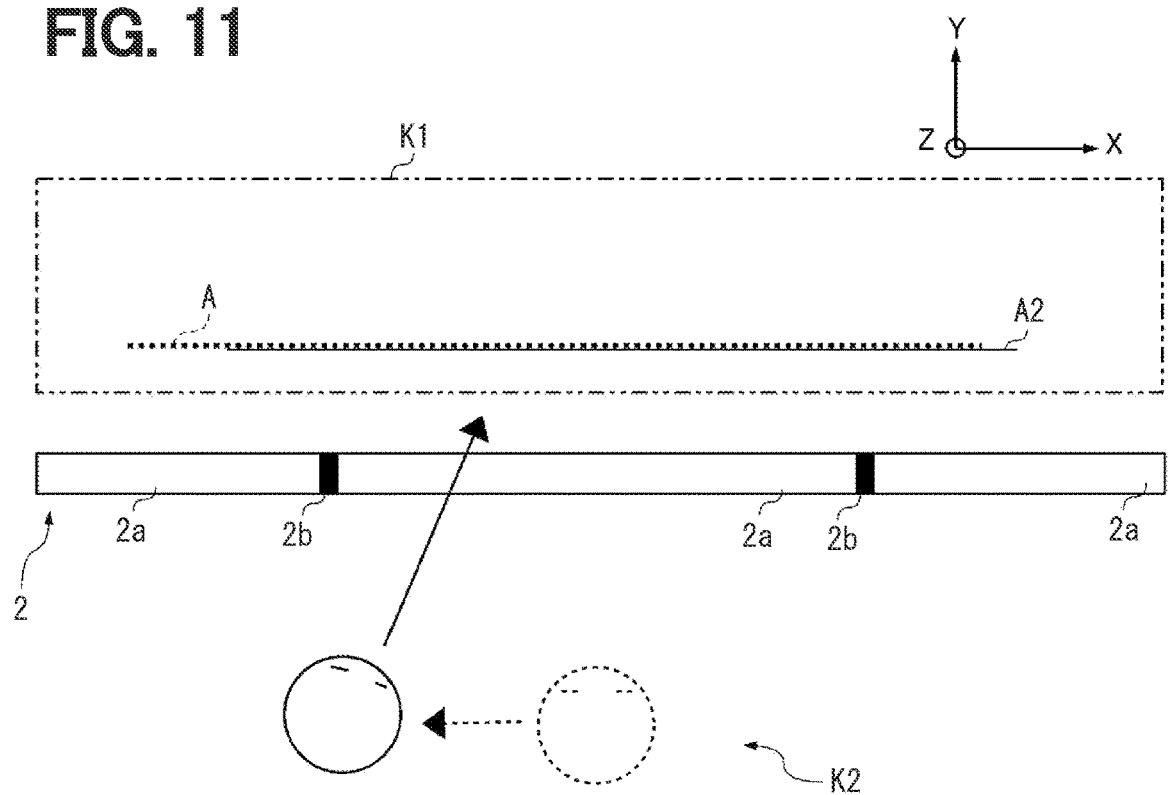
FIG. 11 is a fifth diagram showing a relationship between the virtual space and the actual space.
Figure 12:
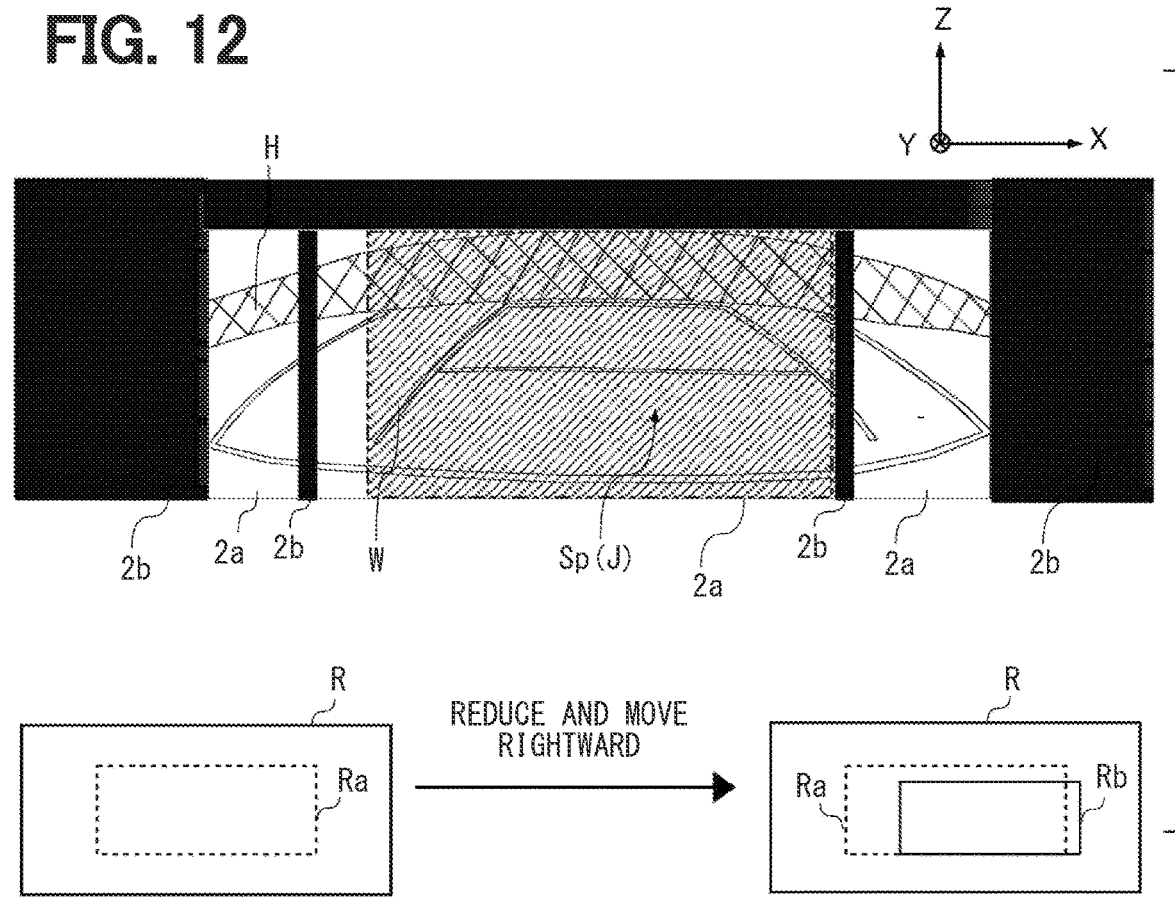
FIG. 12 is a third screen example shown on the plurality of displays.

Also, the important information J may be drawn as follows. In the case where the occupant tilts the head to the left and checks the display 2a, when the control device 11 executes the hiding prevention process in S9 of FIG. 4, as shown in FIGS. 11 and 12, the image content of the region Ra may be shifted rightward and displayed using image content of a new region Rb, which is obtained by reducing the size vertically and horizontally. At this time, the display processing unit 13 can display the important information J on one display 2a as shown in FIG. 12 even when the image A2 of the image content of the region Rb is drawn on the same XZ plane as the image A in the virtual space K1. Even when the occupant shifts the head position and looks into the content, the control device 11 can execute the hiding prevention process and display the content on one display 2a. Therefore, the occupant can confirm even the content near the boundary of the frame 2b.

The important information J may be preferably intended for vehicle contents related to the keywords of safety and security. The vehicle contents for the important information J may include a vehicle content obtained by performing an image recognition and extracting a part of region related to the vehicle control from the image contents that are displayed on the plurality of displays 2a of the P-to-P display 2 and include, for example, an obstacle such as the wall H requiring the collision avoidance, the different vehicle such as the a vehicle or a bicycle moving outside the vehicle, a pedestrian, the destination target of the vehicle such as the frame W described above, and the like. Such a partial region is a region having a relatively high degree of importance among the contents of the entire image, so it is preferable to position it as important information J. In particular, the important information J may be changed in accordance with various information for vehicle control that is input in a sequential manner. The important information J can be information displayed on a specific part of the back guide monitor, front guide monitor, corner view monitor, and side guide monitor.

According to the present embodiment, by using the occupant's head position and angle detected by the occupant state monitor 22a and the 3D coordinates of the virtual space K1 set for the image content, it is possible to define the relative position between the occupant's head position and the display 2a that displays the image content, and determine whether the occupant is viewing the image content. As a result, the visibility of each image content can be implemented according to the occupant's head position and angle.

In the comparative example, a part of the important information J displayed across the plurality of displays 2a is necessary to be constantly hidden. However, in the present embodiment, even when the important information J exists in the periphery of the boundary of the frame 2b, the occupant can certainly visually recognize it. Thereby, the occupant cane feel a sense of unity of the image content. In the present embodiment, the plurality of horizontally continuous displays 2a have been described. However, other physical arrangements, such as vertically linked displays 2a and 3, are also applicable.

Although the case where the occupant moves the head position left and right has been described, the present disclosure is not limited to this. A case where the head position is shifted forward and backward and up and down is also applicable. For example, in the case of moving forward and backward, when the movement is detected by the occupant state monitor 22a, the display processing unit 13 can change the display state of the image content in accordance with the movement of the occupant's head position by enlarging or reducing the image drawn in the virtual space K1 or adjusting the position of the coordinates of the image drawn in the virtual space K1. As a result, the similar effect as described above can be obtained.

Second Embodiment

A second embodiment will be described with reference to FIGS. 13 to 21. The information process device 10 displays a navigation map screen G2 on the P-to-P display 2 by executing the navigation application, and executes the navigation function by sequentially updating a current position mark M1 and a destination mark M2 on the map screen G2. At this time, since the P-to-P display 2 can display the map screen G2 in a laterally large screen, the occupant can easily check the map.

Figure 13:
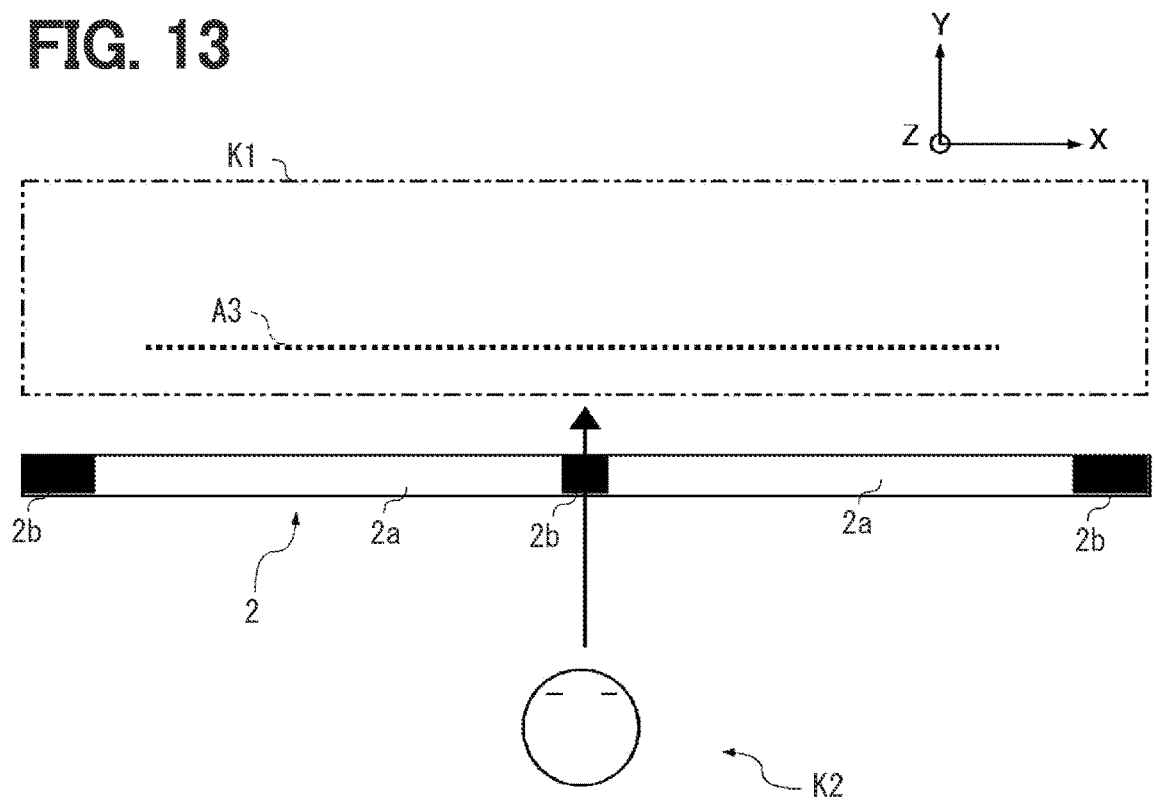
FIG. 13 is a sixth diagram showing a relationship between the virtual space and the actual space according to a second embodiment.
Figure 14:
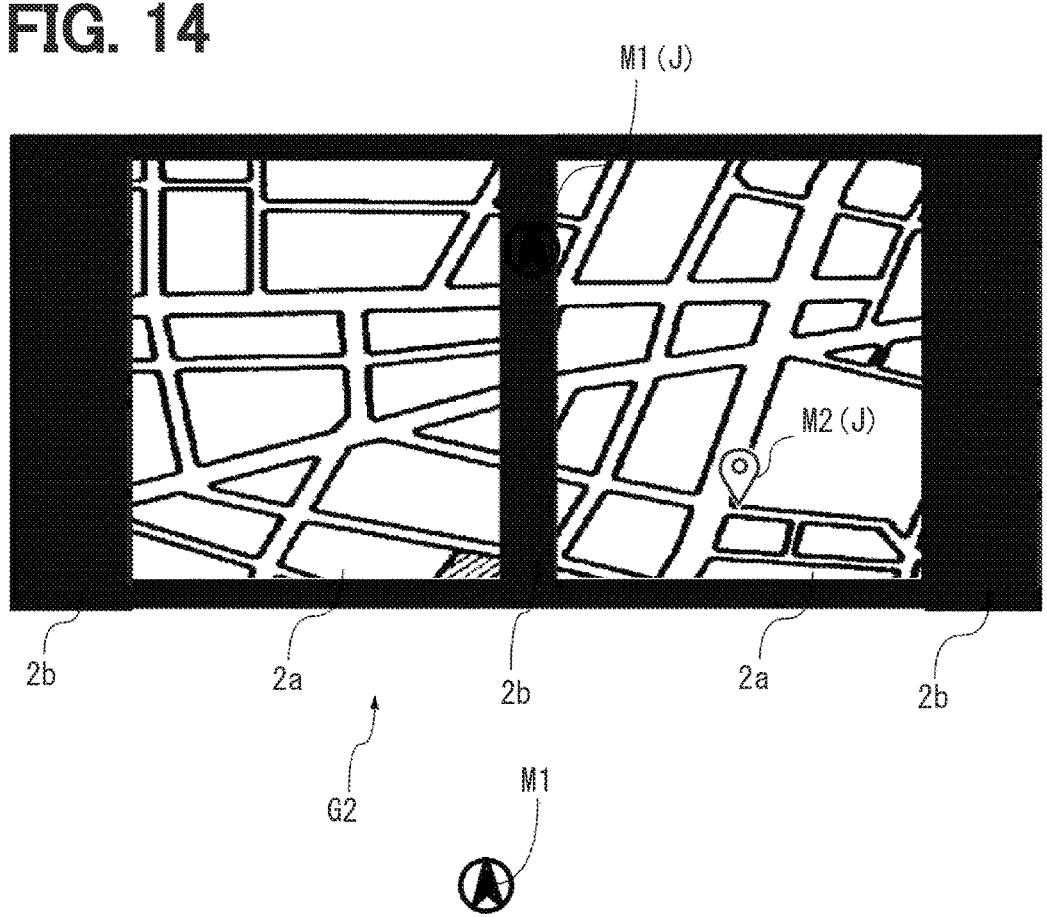
FIG. 14 is a fourth screen example shown on the plurality of displays.

However, as shown in FIG. 13, the display processing unit 13 displays an image A3 of the map screen G2 at the default coordinate position in the virtual space K1. Therefore, even in a case where the map screen G2 is displayed over the plurality of displays 2a as shown in FIG. 14, when the current position mark M1 is hidden in the frame 2b and the occupant cannot confirm it, it is difficult for the occupant to instantly determine where the current position of the vehicle is on the map screen G2.

Therefore, the information processing device 10 positions the information such as the current position mark M1, the destination mark M2, and the display of the branch guidance to the destination as the important information J, and keeps displaying it on any display 2a of the P-to-P display 2. In the above example, the display processing unit 13 moves the coordinate position of the image A3 of the map screen G2 in the virtual space K1 so that the current position mark M1 can be reliably viewed by the occupant based on the detection information obtained by detecting the occupant's head position and line of sight. In the example shown in FIG. 15, the image A3 is moved in parallel along the X-axis direction. See image A4 after the movement. The occupant can confirm the current position mark M1 by viewing the image A4 in the virtual space K1.

Further, the control device 11 can detect that the content including the important information J has been confirmed by the occupant based on the detection result of the occupant monitor 22 and the display state of the display 2a by the display processing unit 13. After that, the display processing unit 13 preferably maintains or changes the display position of the content so that the content including the important information J can be viewed continuously.

That is, after the control device 11 detects that the occupant has viewed the contents including the important information J, the display position is changed and controlled by combining the occupant's head position and the display position of the important information J so that the important information J is kept in the occupant's view field without being blocked by the frame 2b. Thereby, it may be preferable that the occupant can continue to view the content including the important information J as long as the occupant continues to view the display 2a. This is not the case where it is detected by the occupant state monitor 22a that the line of sight is removed from the display 2a. Further, when the control device 11 detects that the occupant's line of sight was removed from the display 2a for a momentary predetermined time (for example, a time lower than one second) but turned the line of sight to the same display 2a again, the control device 11 may exceptionally allow the content including the important information J to continue to be in the visible state.

Figure 15:
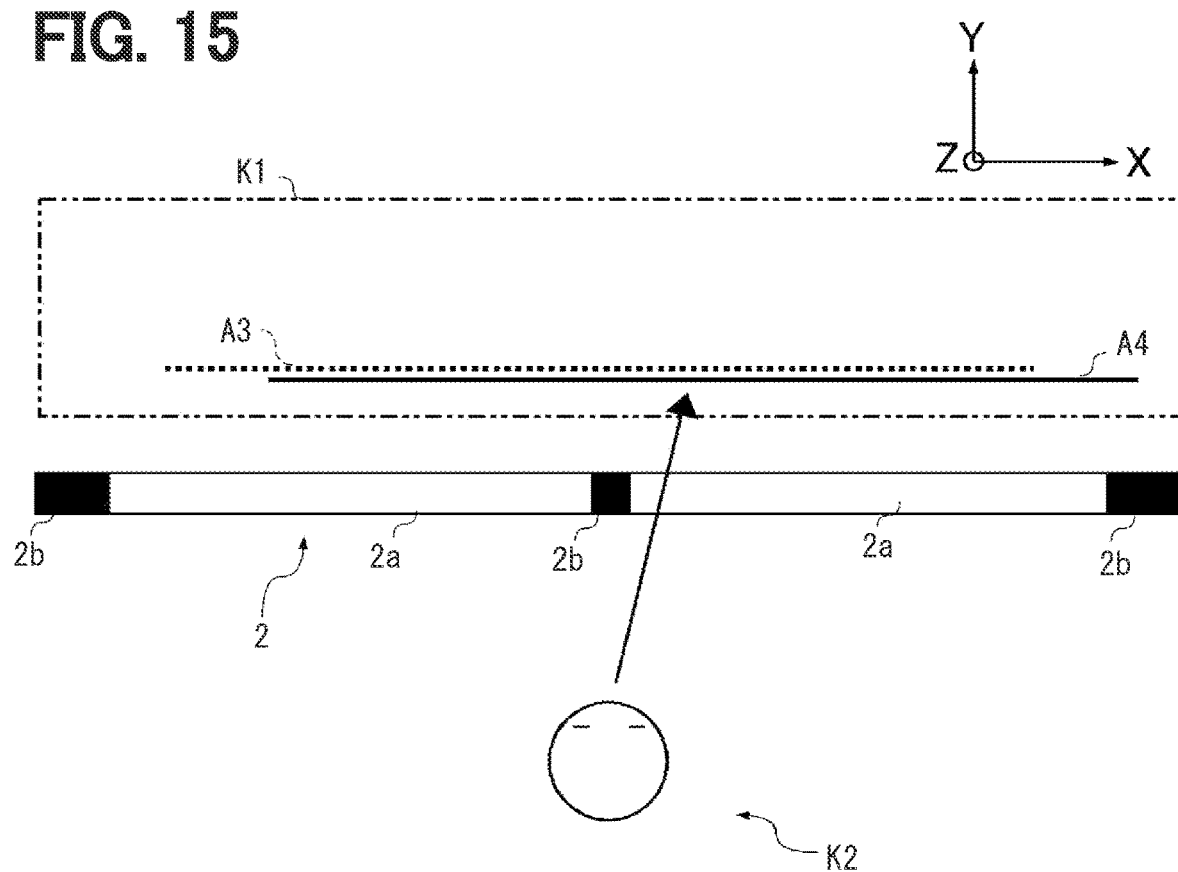
FIG. 15 is a seventh diagram showing the relationship between the virtual space and the actual space.
Figure 16:
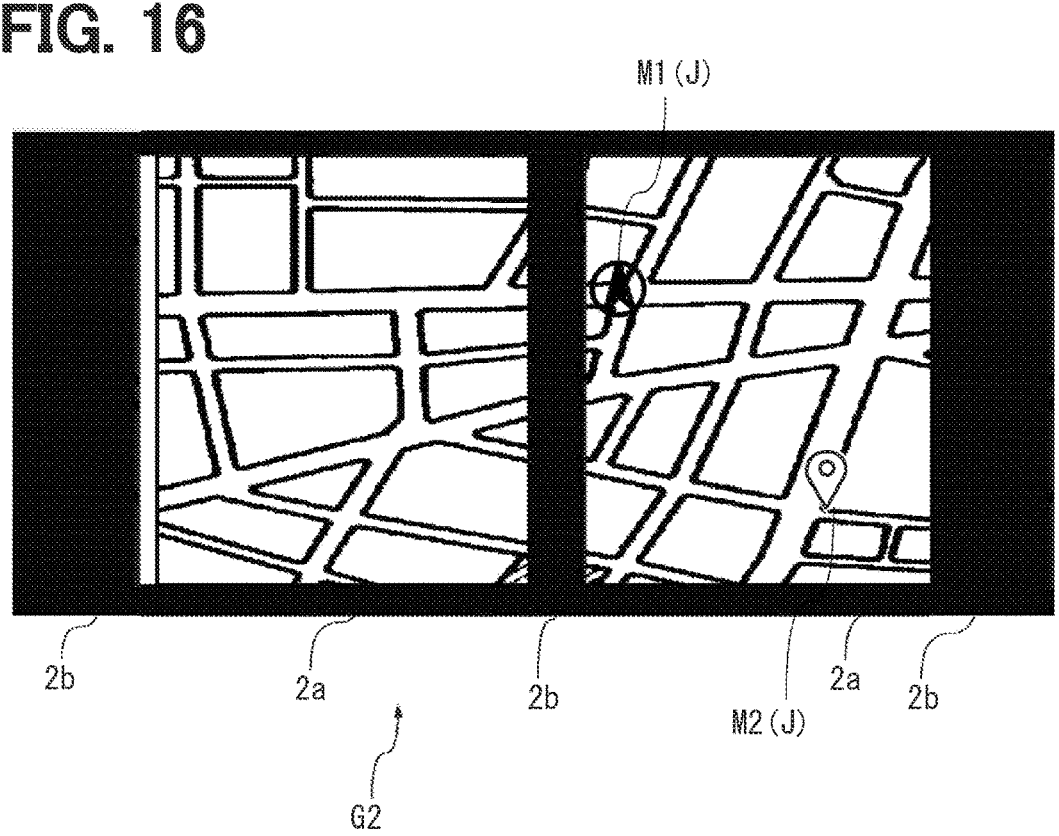
FIG. 16 is a fifth screen example shown on the plurality of displays.
Figure 17:
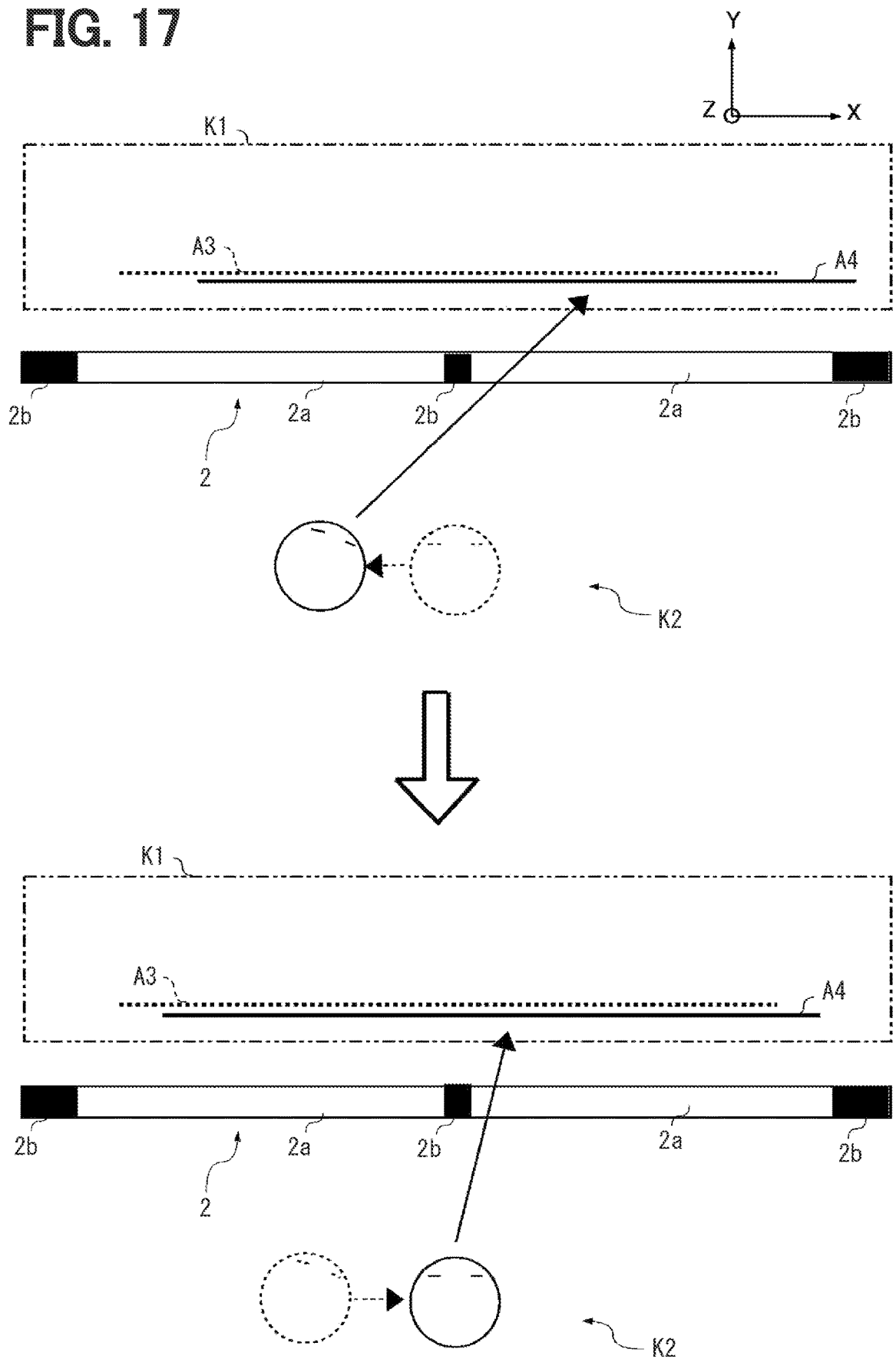
FIG. 17 is an eighth diagram showing the relationship between the virtual space and the actual space.

For example, when the control device 11 detects that the current position mark M1 is seen by the occupant as shown in FIG. 15, and then when the occupant state monitor 22a detects that the occupant's head position has moved as shown in an upper part of FIG. 17, the display processing unit 13 may move the display coordinate of the image A4 so that the occupant continues to view the current position mark M1. Further, after that, when the occupant state monitor 22a has detected that the occupant's head position has returned to the original position, the display processing unit 13 sets the display position on the display 2a by maintaining or changing the coordinates of the image A4 in the virtual space K1 based on the occupant's head position, as shown in a lower part of FIG. 17. Thereby, the occupant can keep to view the current position mark M1 that is the important information J.

Further, in a case where the display processing unit 13 detects a state that the amount of movement of the occupant's viewpoint is greater than a predetermined value based on the detection result of the occupant state monitor 22a, when the occupant cannot confirm the important information J displayed on one display 2a, it is desirable to display the information on another adjacent display 2a, for example.

Figure 18:
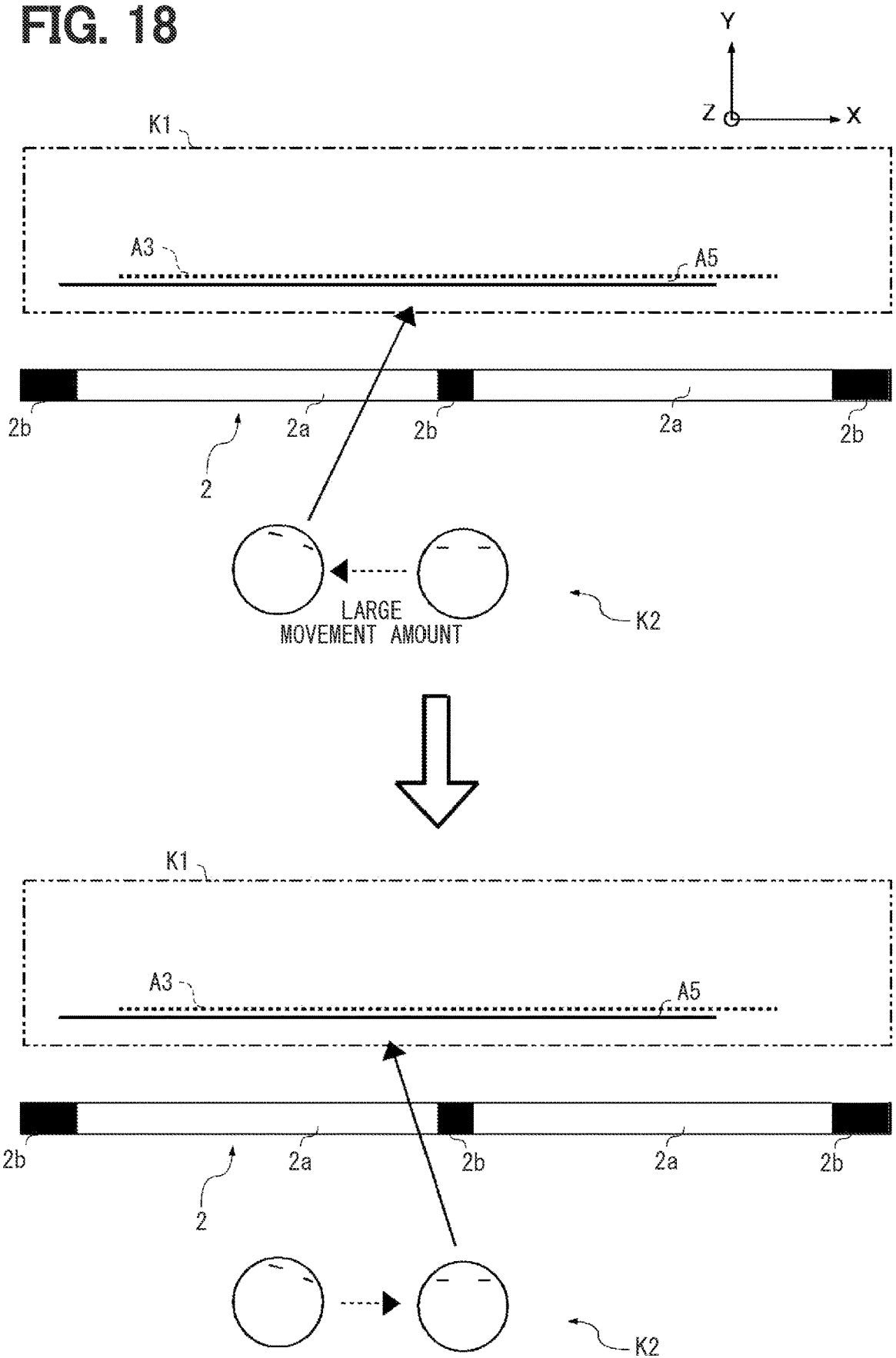
FIG. 18 is a ninth diagram showing the relationship between the virtual space and the actual space.
Figure 19:
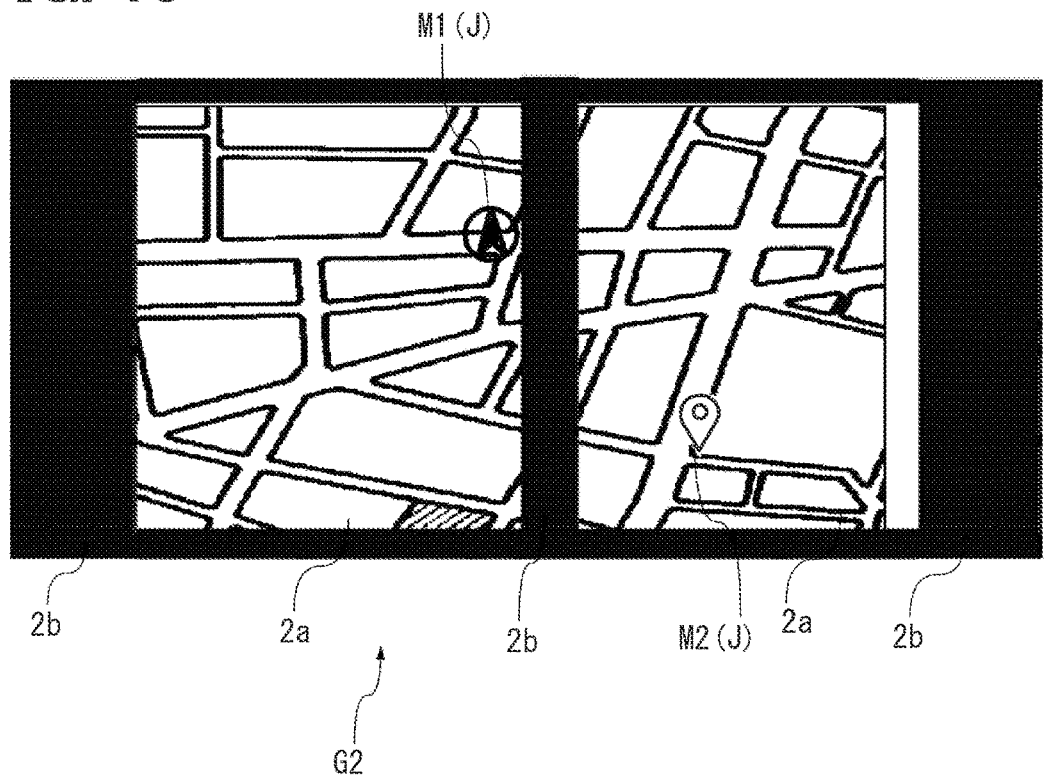
FIG. 19 is a sixth screen example shown on the plurality of displays.

As shown in an upper part of FIG. 18, in a case where the occupant's head position is moved left and the amount of movement exceeds the predetermined value, when the control device 11 determines that the occupant cannot confirm the current position mark M1 displayed on the right display 2a in FIG. 18, the display processing unit 13 may display the image A3 in the left display 2a by moving the image A3 at the display position of the map screen G2 to the image A5 in the virtual space K1, as shown in FIG. 19. Thereby, the occupant can confirm the current position mark M1, which is the important information J, even when the position of the occupant's head moves significantly.

Further, after that, also when the occupant state monitor 22a has detected that the occupant's head position has returned to the original position, the display processing unit 13 sets the display position on the display 2a by maintaining or changing the coordinates of the image A5 in the virtual space K1 based on the occupant's head position. Thereby, the occupant can keep to confirm the current position mark M1 that is the important information J.

Figure 20:
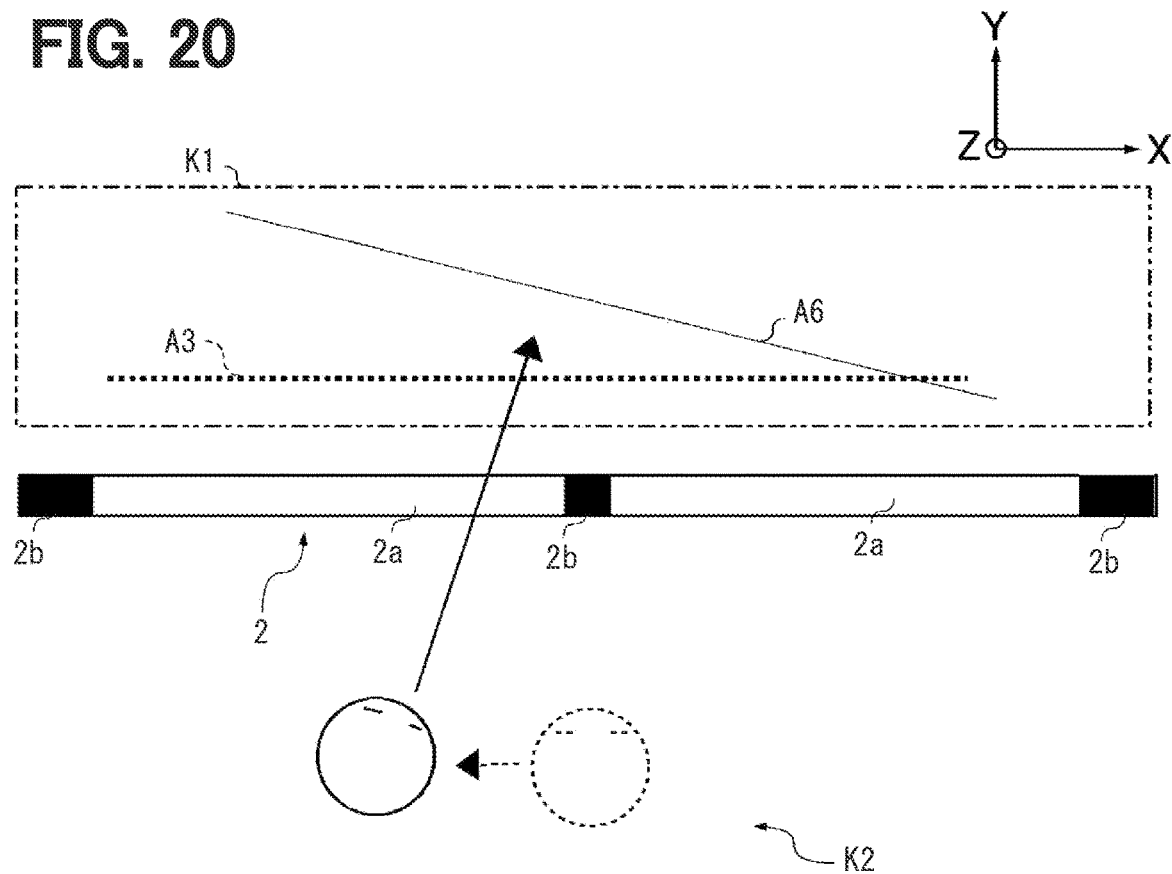
FIG. 20 is a tenth diagram showing the relationship between the virtual space and the actual space.
Figure 21:
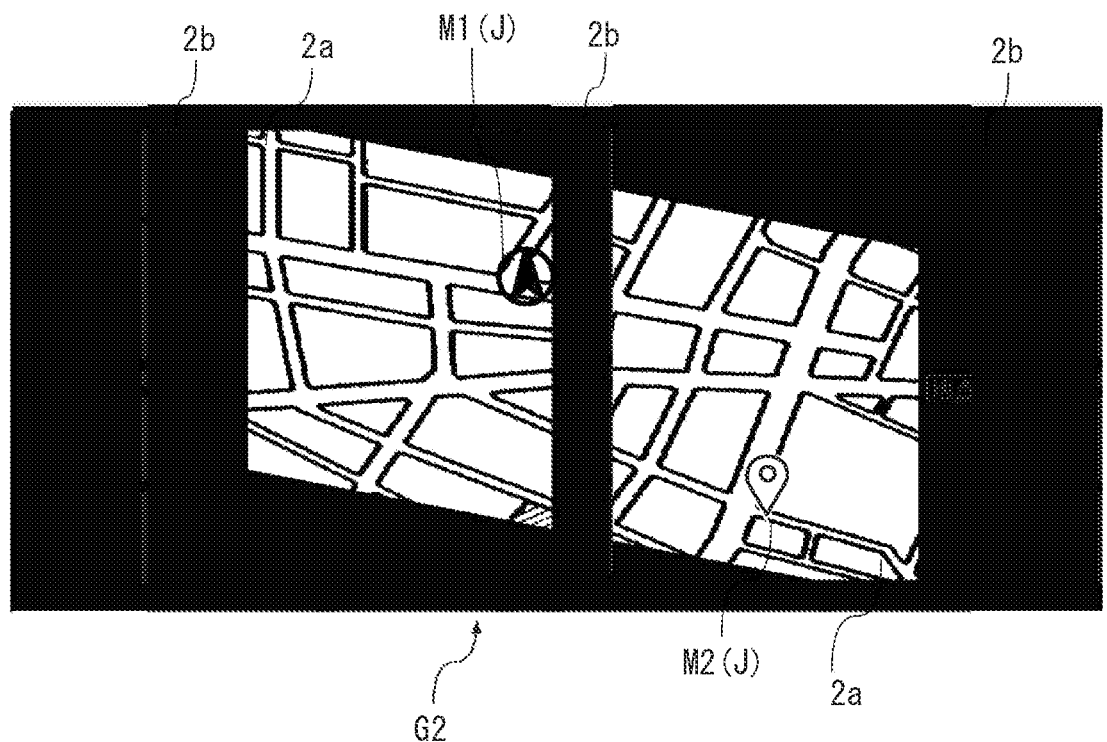
FIG. 21 is a seventh screen example shown on the plurality of displays.

Similarly in the second embodiment, the display processing unit 13 may draw in 3D in the virtual space K1. That is, the display processing unit 13 may transform the coordinates of the above-described reference image A3 in the virtual space K1, and may draw it while tilting it in the virtual space K1 as shown in FIG. 20. As shown in the specific examples of FIGS. 20 and 21, the display processing unit 13 draws the relationship between the line of sight of the driver and the image A6 after the coordinate transformation so as to be orthogonal in the virtual space K1, for example, so that the drawn screen can be expressed so as to match the line of sight of the driver. In this way, the display processing unit 13 expresses the image content in 3D so that the important information J can be displayed on the single display 2a. In other words, the display processing unit 13 converts the two-dimensional content into the three-dimensional content. Thereby, the driver can easily view the important information J.

According to the present embodiment, in the case of the map screen G2 related to navigation, the coordinate position of the virtual space K1 is maintained or changed based on whether the point of interest is the current position mark M1, which is the important information J. The present embodiment provides the similar effect to the embodiment described above.

Third Embodiment

Figure 22:
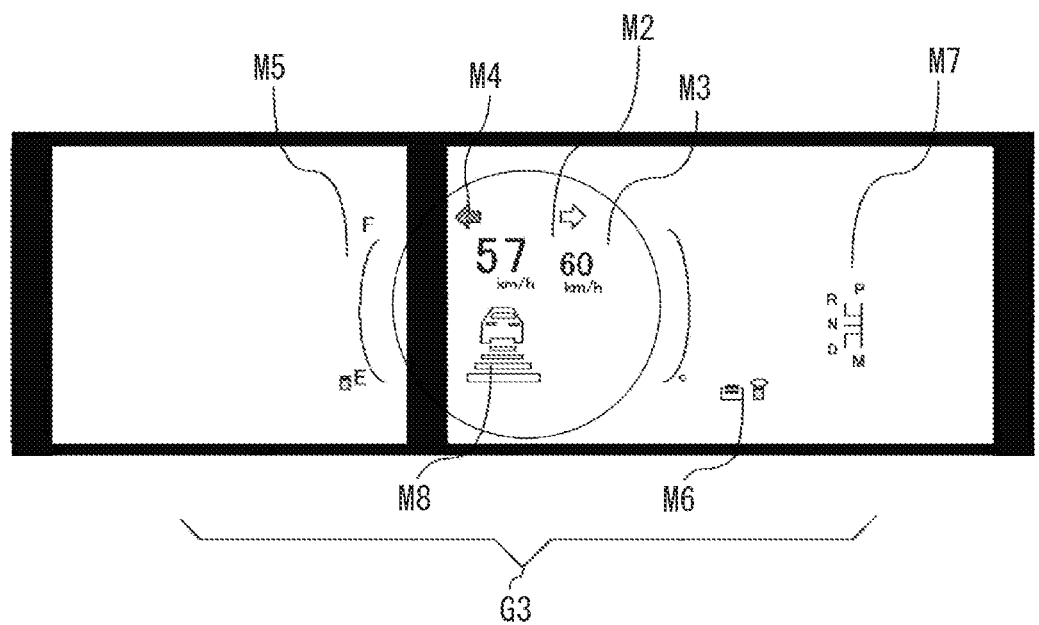
FIG. 22 is an eighth screen example shown on the plurality of displays according to a third embodiment.
Figure 23:
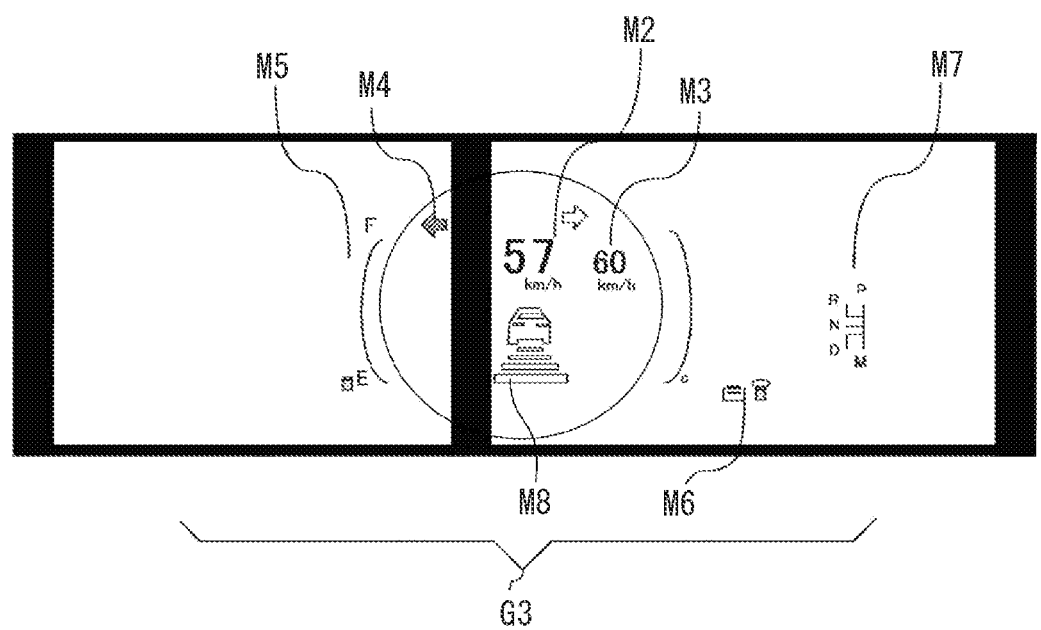
FIG. 23 is a ninth screen example shown on the plurality of displays.

A third embodiment will be described with reference to FIGS. 22 and 23. As shown in FIG. 22 or 23, when the display processing unit 13 causes the display 2a to display a meter image G3, the technology similar to that of the above embodiment may be applied.

The display of the meter image G3 may include the display of the actual speed M2, the display of the target speed M3 during automated driving operation or driving assistance operation, the blinking display of a turn direction M4 of the direction indicator, q display of a remaining fuel amount M5, display of warnings M6, the display of a shift range position state M7 and the display of a following state M8 following the preceding vehicle, and the like.

When displaying these image contents M2 to M8 on the display 2a, the display processing unit 13 preferably changes the coordinates drawn in the virtual space K1 based on the detection result of the occupant state monitor 22a so that the occupant can continue to view all of the image contents M2 to M8 in the display 2a.

For example, as shown in FIG. 22, the display processing unit 13 displays the actual speed M2 of "57 km/h" at a position close to the frame 2b and displays the turn direction M4 of a direction indicator. However, in this case, the actual speed M2 and the turn direction M4 may be moved leftward or right ward and displayed on the display 2a. The similar applies to the target speed M3, the remaining fuel amount M5, the warnings M6, the shift range position state M7, and the following state to the preceding vehicle M8. The present embodiment provides the similar effect to the embodiment described above.

Fourth Embodiment

Figure 24:
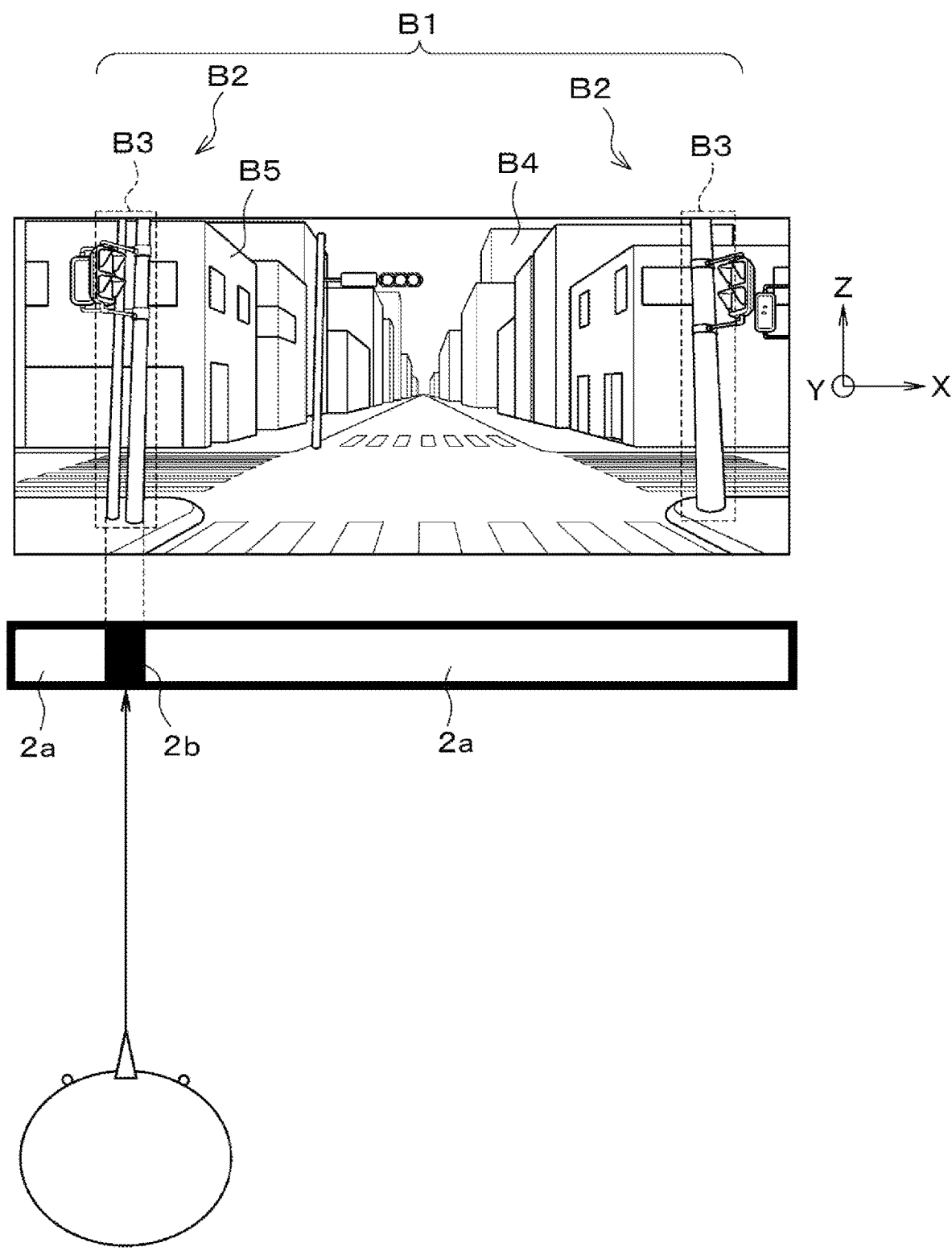
FIG. 24 is a first diagram schematically illustrating a positional relationship between the non-display region and a vehicle exterior object according to a fourth embodiment.
Figure 25:
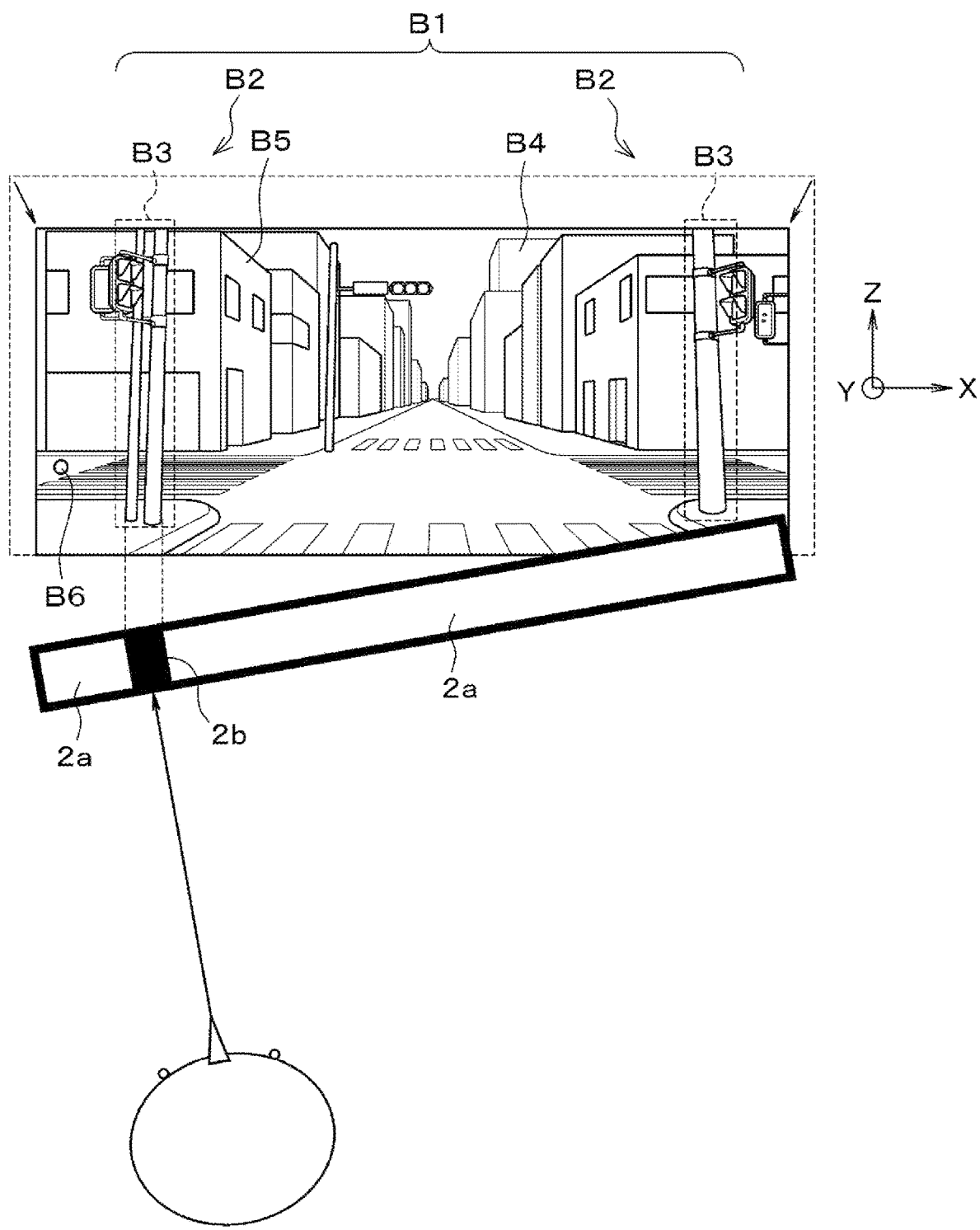
FIG. 25 is a second diagram schematically illustrating a positional relationship between the non-display region and the vehicle exterior object.
Figure 26:
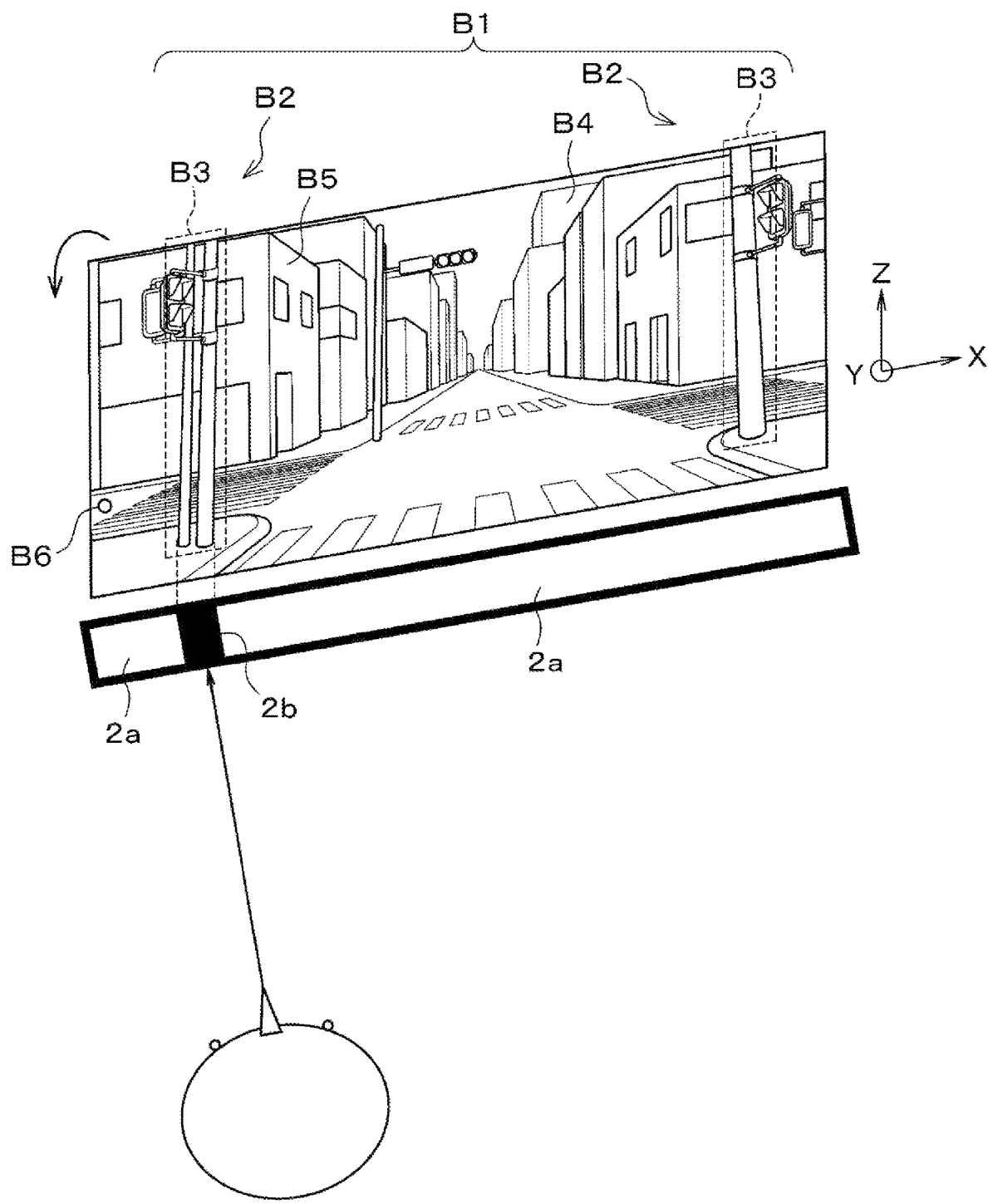
FIG. 26 is a third diagram schematically illustrating a positional relationship between the non-display region and the vehicle exterior object.

A fourth embodiment will be described with reference to FIGS. 24 to 28. In the present embodiment, a feature detection unit configured by the peripheral camera 23 that captures an image of the outside of the vehicle, the distance detection sensor 24 that detects the distance to an obstacle, or the like detects a specific vehicle exterior object B1 from the content, and the display processing unit 13 displays the vehicle exterior object B1 in accordance with the frame B2. The specific vehicle exterior B1 may be arbitrarily set as appropriate, but it is preferable to use the vehicle exterior obstacle B2 that forms a blind spot of the line of sight. Examples of the vehicle exterior obstacle B2 may include, as shown in FIG. 24, a utility pole B3, a high-rise building B4, and a vehicle parked on the road. Other arbitrary vehicle exterior objects B1 may include another building B5, a manhole B6 (see FIG. 25), and the like.

In such a case, it is preferable that the display processing unit 13 deforms the content so that the vehicle exterior object B1 is overlapped on the frame 2b according to the movement of the line of sight of the vehicle occupant based on the detection result of the occupant state monitor 22a, and displays the content on the plurality of displays 2a.

FIG. 24 shows an example of a normal display image. When executing the display process of the content using the 2D expression image, the display processing unit 13 executes a display process of, while the occupant state monitor 22a detects the line-of-sight movement of the occupant state monitor 22a, moving the display region on the two-dimensional plane, here, the X-Z plane so that the utility pole B3, which is the vehicle exterior object B2, overlaps with an extension line n of the frame 2b, in response to the line-of-sight movement of the occupant.

Further, when the vehicle travels, the image captured by the peripheral camera 23 changes, and the content displayed by the display processing unit 13 also changes at any time. In such a case, it is desirable that the display processing unit 13 executes a display process of reducing (or enlarging) the image of the content as shown in the display image in FIG. 25, or transforming the content by rotating or distorting the image around the position of the frame 2b as shown in the display image in FIG. 26, and matching the vehicle exterior object B1 to the frame 2b from the viewpoint of the occupant. The display processing unit 13 displays the content that does not require the visual recognition of the occupant on the frame 2b existing between the plurality of displays 2a. Thereby, it is possible to execute the display process so as not to cause the uncomfortable feeling in the two-dimensional display while utilizing the non-display region of the frame 2b.

Further, for example, when a plurality of cameras such as an ADAS stereo camera are used as the peripheral camera 23 to acquire peripheral information and captured information of the vehicle, it is desirable that the display processing unit 13 acquires an image of a region that is the blind spot from the vehicle occupant in the traveling direction of the vehicle due to the external obstacle B2 from peripheral information of the vehicle, and displays the acquired image content on at least one of the plurality of displays 2a.

The peripheral camera 23 captures images with a plurality of cameras, so that captured images accompanying the traveling of the vehicle can be synthesized, and well-known technologies such as AI processing can be used to acquire images with few blind spots as much as possible. Therefore, the display processing unit 13 can display, as the content, the pedestrian and the bicycle hidden behind the vehicle exterior obstacle B2, such as the utility pole B3, the high-rise building B4, and the parked vehicle on the road, and can provide the attention to the occupant.

Figure 27:
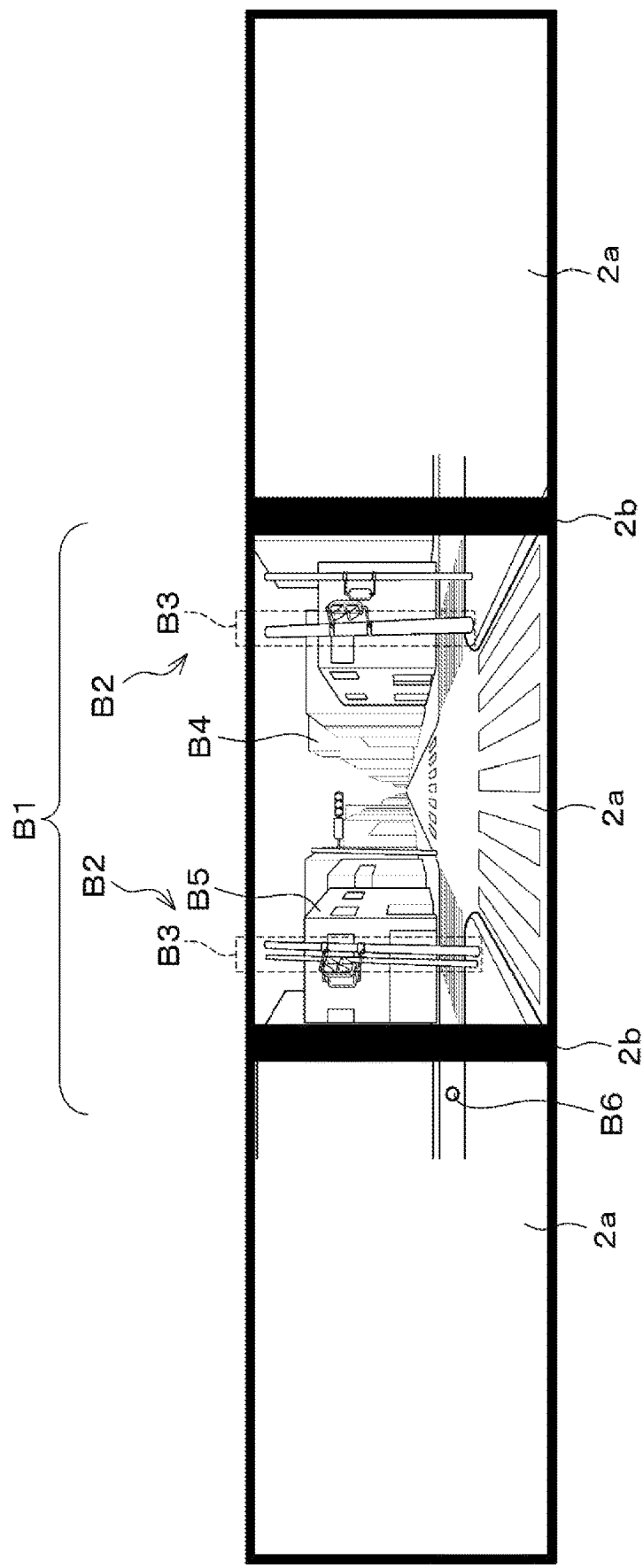
FIG. 27 is a fourth diagram schematically illustrating a positional relationship between the non-display region and the vehicle exterior object.

Also, a case illustrated in FIG. 27 will be described. In FIG. 27, in the P-to-P display 2, the frames 2b exist between a plurality of adjacent displays 2a. The plurality of vehicle exterior objects B2 such as, for example, the utility poles B3, are detected as vehicle exterior objects B1 in the content of the image captured by the peripheral camera 23 during the vehicle traveling.

Figure 28:
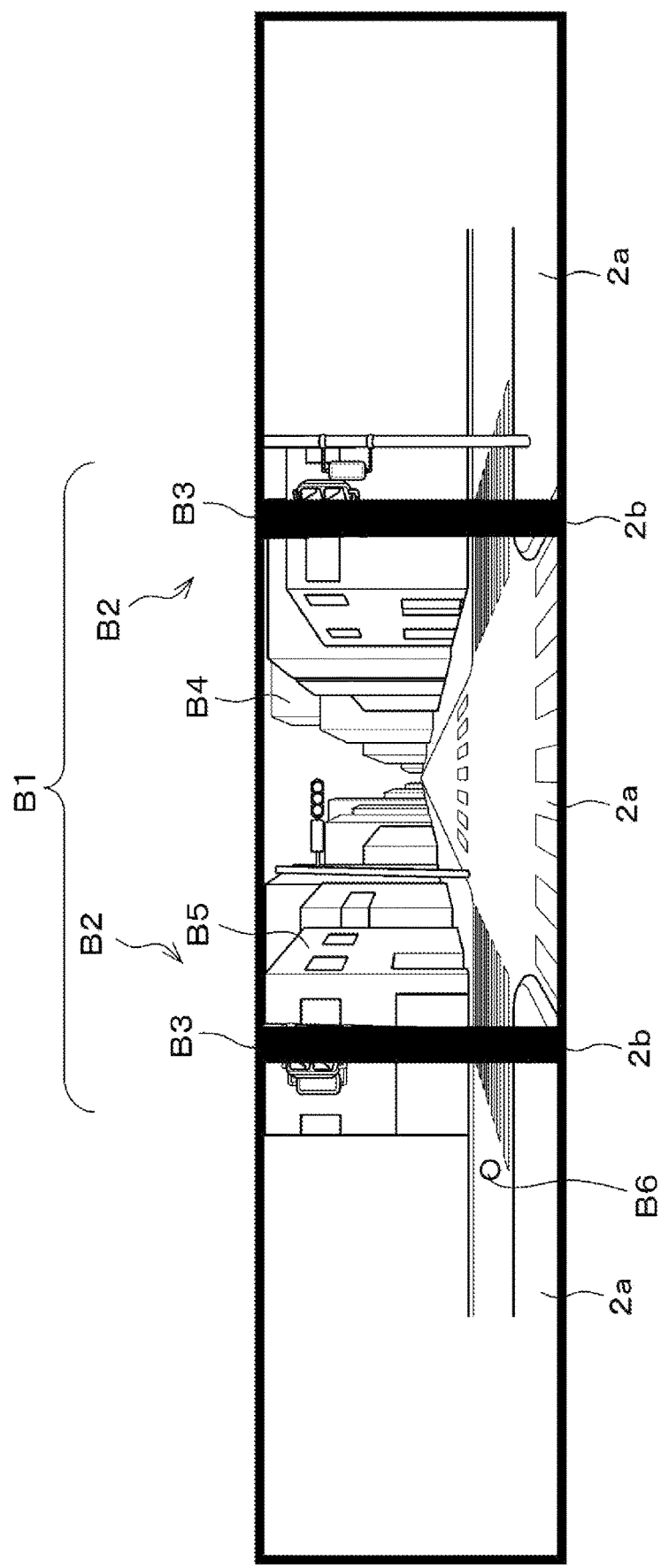
FIG. 28 is a fifth diagram schematically illustrating a positional relationship between the non-display region and the vehicle exterior object.

In such a case, as illustrated in FIG. 28, it is desirable that the display processing unit 13 changes the scale of the content, for example, enlarges it, so that the plurality of utility poles B3 are displayed according to the corresponding frame 2b. In this example, the example of enlarging the size is described. However, the content size may be reduced.

Further, for example, in such a case, as shown in FIG. 27, in addition to the utility pole B3, the vehicle exterior object B1 such as the high-rise building B4, the building B5, the manhole B6, and the like may also be detected. In such a case, it is desirable that the information processing device 10 uses the distance detection sensor 24 to detect the direction and distance to the obstacle approaching the vehicle, and the display processing unit 13 executes the display process of the vehicle exterior object B1 close to the vehicle in accordance with the frame 2b. In the example of FIG. 27, the vehicle exterior object vehicle B1 closest to the vehicle is detected as the utility pole B3, so the display processing unit 13 executes the display process to match the utility pole B3 to the frame 2b.

Then, the display processing unit 13 can execute the display process without narrowing the angle of view more than necessary, and can execute the display process without causing the uncomfortable feeling of the occupant of the vehicle. In the example of FIG. 28, an example is shown in which the frames 2b match with the utility poles B3. However, when the utility poles B3 are removed from the captured image of the peripheral camera 23 as the vehicle moves forward, it may be preferable to execute the display process by matching the frame 2b with the high-rise building B4 or another building B5. According to such an embodiment, it is possible to execute the display process so as not to cause the uncomfortable feeling of the occupant.

Other Embodiments

The present disclosure is not limited to the embodiments described above, but can be implemented by various modifications, and can be applied to various embodiments without departing from the spirit of the present disclosure.

Figure 9:
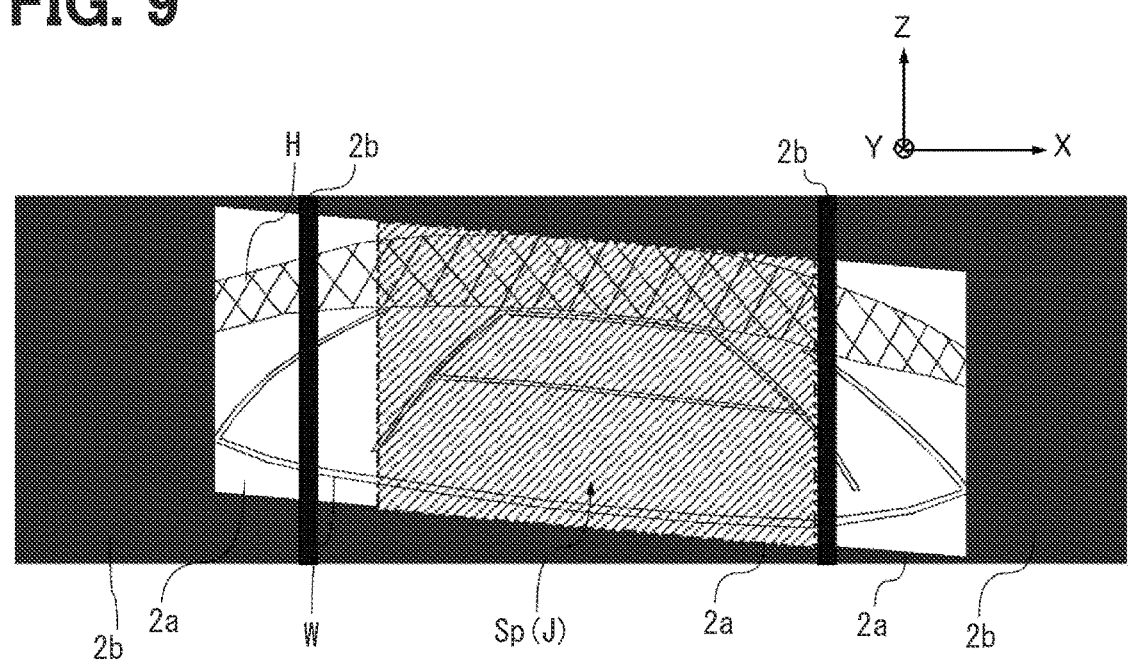
FIG. 9 is a second screen example shown on the plurality of displays.
Figure 10:
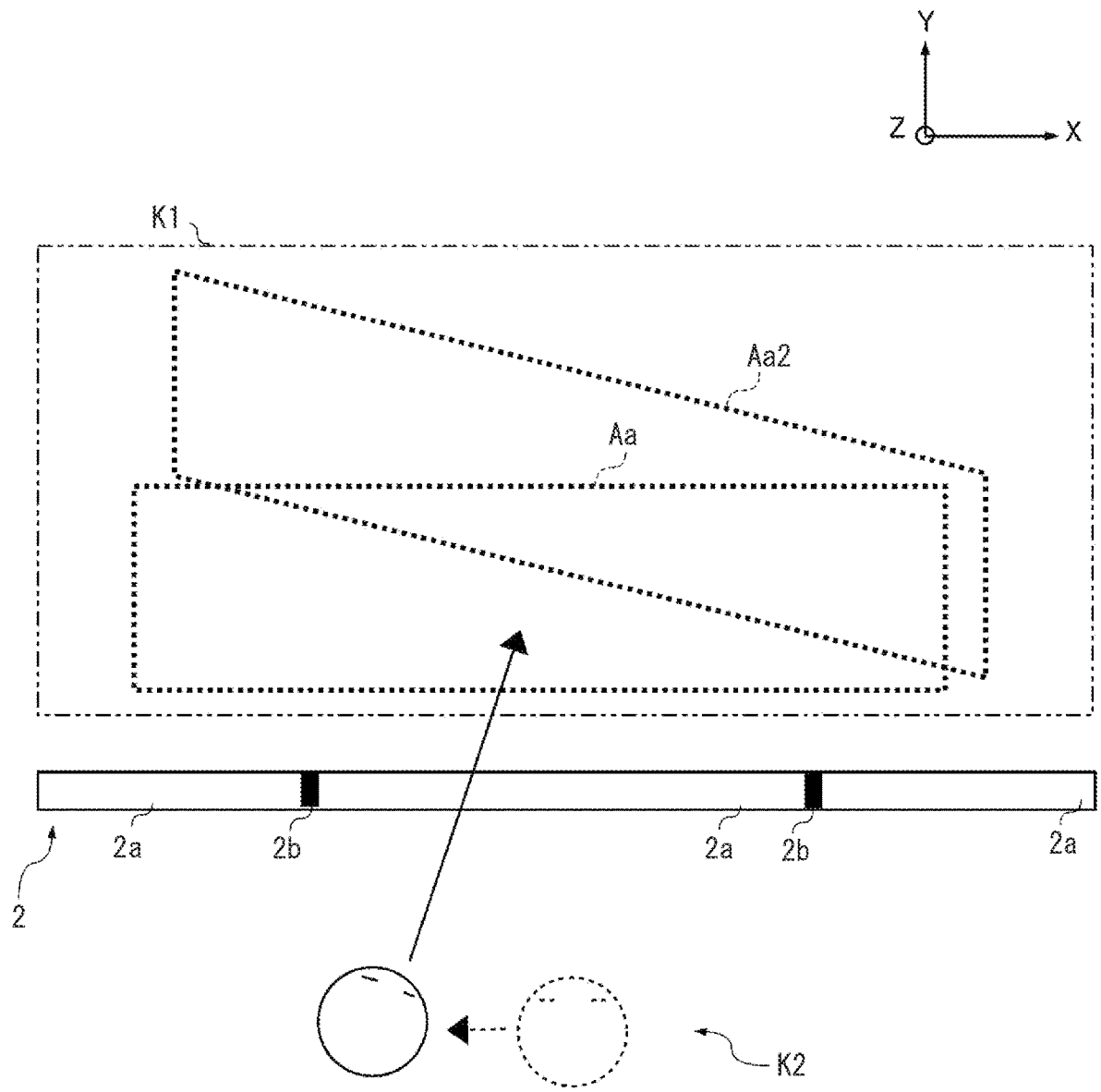
FIG. 10 is a fourth diagram showing the relationship between the virtual space and the actual space.

In the first embodiment, as shown in specific examples in FIGS. 8 and 9, drawing is performed while tilting the image in the virtual space K1. However, the display processing unit 13 may not orthogonalize the relationship between the line of sight of the driver and the image A2 after the coordinate transformation, for example, in the virtual space K1. Also in the second embodiment, as shown in the specific examples of FIGS. 20 and 21, the display processing unit 13 draws the relationship between the line of sight of the driver and the image A6 after the coordinate transformation so as to be orthogonal in the virtual space K1, for example, so that the drawn screen can be expressed so as to match the line of sight of the driver. However, the display processing unit 13 may not orthogonalize the relationship between the line of sight of the driver and the image A26 after the coordinate transformation.

Figure 29:
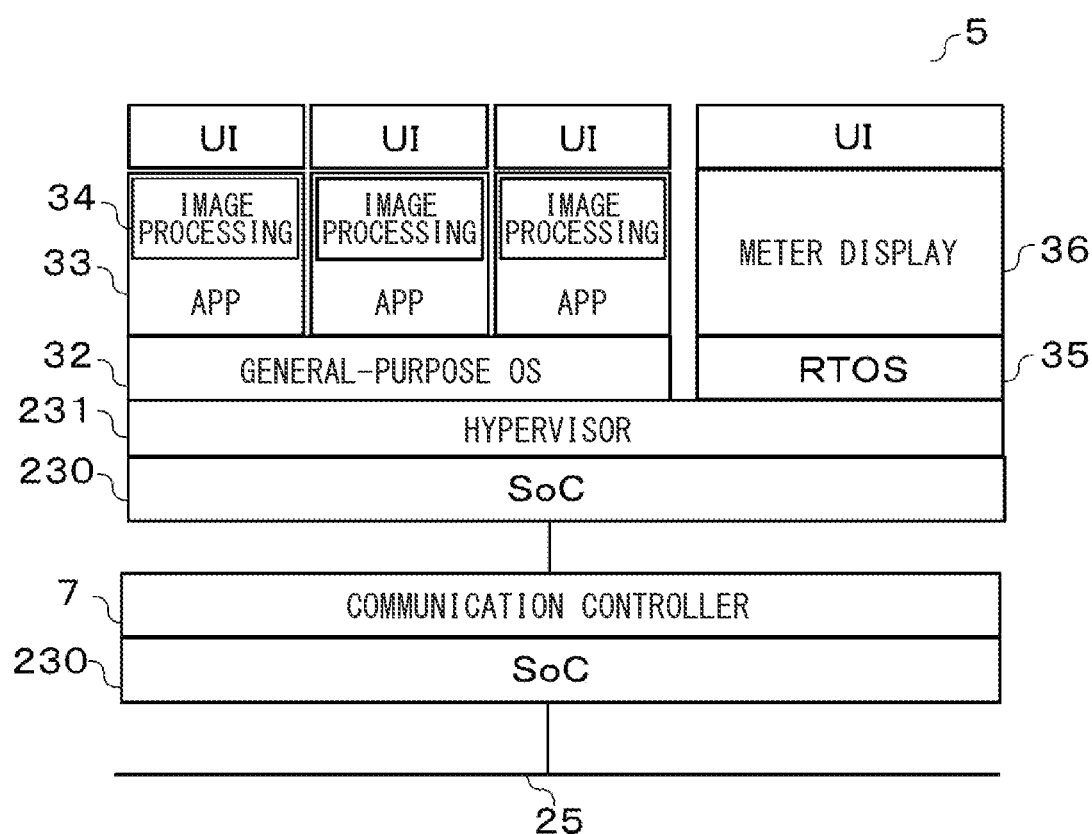
FIG. 29 is a configuration diagram schematically showing hardware and software according to a modification.

In the above-described embodiment, the display system ECU 5 is configured by a plurality of ECUs 5. Alternatively, the display system ECU 5 may be configured as an HCU by one ECU. FIG. 29 shows an example of hardware and software configuration at this time. An SoC 230 is mounted on each ECU 5, and a microcomputer is incorporated in the SoC 230 mounted on each ECU 5. A general-purpose OS 32 and a real-time OS 35 are configured on a hypervisor 231 of the microcomputer incorporated in the SoC 230 of the ECU 5. A plurality of various apps 33 are configured to operate on the general-purpose OS 32. Also, the real-time OS 35 can perform processing with higher real-time performance than the general-purpose OS 32. A meter app 36 is configured to operate on the real-time OS 35. Even if such a configuration is employed, the same configuration and effects as those of the above-described embodiment can be obtained.

The control device 11 and the method executed by the display processing unit 13 described in the present disclosure may be implemented by a dedicated computer including a processor programmed to execute one or more functions embodied by a computer program and a memory. Alternatively, the control device 11, the display processing unit 13 and the method according to the present disclosure may be achieved by a dedicated computer including a processor with one or more dedicated hardware logic circuits. Alternatively, the control device 11, the display processing unit 13, and the method according to the present disclosure may be achieved using one or more dedicated computers including a combination of the processor and the memory programmed to execute one or more functions and the processor with one or more hardware logic circuits. The computer program may also be stored on a computer readable and non-transitory tangible storage medium as instructions executed by a computer.

The present disclosure has been described in accordance with the embodiments. However, it is to be understood that the present disclosure is not limited to the embodiments and structure. The present disclosure covers various modification examples and equivalents thereof. In addition, various combinations and modes, as well as other combinations and modes including only one element, more, or less, are within the scope and idea of the present disclosure.

The invention claimed is:

1. A vehicle display system configured to display content on a plurality of displays sandwiching a non-display region, the system comprising:
    an occupant state monitor configured to detect
        a head position of an occupant of a vehicle,
        an angle of a head of the occupant, and
        a line of sight of the occupant; and
    a display processor configured to
        execute, based on a detection result of the occupant state monitor, a hiding prevention process on important information under a condition that the content to be displayed on at least one of the plurality of displays includes the important information, and
        display the important information on a display screen of the at least one of the plurality of displays, wherein
    the non-display region is formed by a frame, and the content cannot be displayed in the non-display region, and
    the display processor is further configured to determine whether the important information is hidden by the frame, and performs display to cause the important information not to be hidden by the frame when determining that the important information is hidden by the frame.

2. The vehicle display system according to claim 1, wherein
    the display processor is configured to
        output an image in a virtual space defined by a virtual coordinate and
        project the image on the display screen of the at least one of the plurality of displays, and
    the non-display region is formed by the frame positioned between the virtual space and a real space where the occupant exists.

3. The vehicle display system according to claim 1, wherein
    the important information is intended for a vehicle content obtained by image recognition and extraction of a part of region from the content to be displayed on the plurality of displays, and
    the part of region is related to a vehicle control.

4. The vehicle display system according to claim 1, wherein
    the display processor is configured to
        maintain or change a display position of the content to cause the occupant to view the content, after a detection that the occupant has viewed the content based on a detection result of the occupant state monitor, and
        execute the hiding prevention process after maintaining or changing the display position.

5. The vehicle display system according to claim 2, wherein
    the display processor is configured to execute the hiding prevention process by parallelly moving the image in the virtual space.

6. The vehicle display system according to claim 1, wherein
    in a case where the display processor detects a state that a movement amount of an occupant viewpoint is greater than a predetermined value based on a detection result of the occupant state monitor, when the occupant cannot confirm the important information displayed on the at least one of the plurality of displays, the display processor displays the important information on a different display among the plurality of displays.

7. The vehicle display system according to claim 1, wherein
    the display processor is configured to display the important information on any of the plurality of displays by converting a two-dimensional image into a three-dimensional image.

8. The vehicle display system according to claim 1, wherein
    the display processor is configured to display the important information on any of the plurality of displays by executing an enlargement process or a reduction process.

9. The vehicle display system according to claim 1, wherein
    the system is connected to a feature detection unit configured to detect a vehicle exterior object viewed by the occupant of the vehicle from the content, and
    the display processor executes a display process using the plurality of displays by deforming the content to overlap the vehicle exterior object with the non-display region based on a detection result of the occupant state monitor when the feature detection unit has detected the vehicle exterior object.

10. The vehicle display system according to claim 9, wherein
the display processor is configured to enlarge, reduce, rotate, or transform an image of the content to deform the content.

11. The vehicle display system according to claim 9, wherein
when the feature detection unit acquires peripheral information of the vehicle using a plurality of cameras, the display processor
acquires an image of a region that becomes a blind spot with respect to an occupant of the vehicle in a traveling direction of the vehicle due to the vehicle exterior object from the peripheral information of the vehicle, and
executes a display process.

12. The vehicle display system according to claim 9, wherein
in a case where, among the plurality of displays, a plurality of adjacent displays sandwich the non-display region, when the vehicle exterior object includes a plurality of vehicle exterior objects and the plurality of vehicle exterior objects have been detected in the content, the display processor changes a scale to match the plurality of vehicle exterior objects with the non-display region and executes a display process.

13. The vehicle display system according to claim 9, wherein
when the vehicle exterior object includes a plurality of vehicle exterior objects and the plurality of vehicle exterior objects have been detected in the content, the display processor matches, among the plurality of vehicle exterior objects, a vehicle exterior object positioned closer to the vehicle with the non-display region and executes a display process.

14. The vehicle display system according to claim 1, wherein the display processor is further configured to calculate a coordinate of the important information in a virtual space where the important information is displayed, and determine whether the important information is hidden by the frame based on the coordinate of the important information, the head position, the angle, the line of sight, and a coordinate of the non-display region in a real space.

15. The vehicle display system according to claim 1, wherein the plurality of displays are symmetrically arranged along a dashboard of the vehicle.

16. A vehicle display method configured to display content on a plurality of displays including a plurality of display screens sandwiching a non-display region, the method comprising:
causing an occupant state monitor to detect
a head position of an occupant of a vehicle,
an angle of a head of the occupant, and
a line of sight of the occupant; and
causing a display processor to
execute, based on a detection result of the occupant state monitor, a hiding prevention process on important information under a condition that the content to be displayed on at least one of the plurality of displays includes the important information, and
display the important information on a display screen of the at least one of the plurality of displays, wherein
the non-display region is formed by a frame, and the content cannot be displayed in the non-display region, and
the display processor further determines whether the important information is hidden by the frame, and performs display to cause the important information not to be hidden by the frame when determining that the important information is hidden by the frame.

17. The vehicle display method according to claim 16, wherein the display processor further calculates a coordinate of the important information in a virtual space where the important information is displayed, and determines whether the important information is hidden by the frame based on the coordinate of the important information, the head position, the angle, the line of sight, and a coordinate of the non-display region in a real space.

18. A computer-readable non-transitory storage medium storing a vehicle display program configured to display content on a plurality of displays including a plurality of display screens sandwiching a non-display region, the program causing a processor to:
cause an occupant state monitor to detect
a head position of an occupant of a vehicle,
an angle of a head of the occupant, and
a line of sight of the occupant; and
cause a display processor to
execute, based on a detection result of the occupant state monitor, a hiding prevention process on important information under a condition that the content to be displayed on at least one of the plurality of displays includes the important information, and
display the important information on a display screen of the at least one of the plurality of displays,
the non-display region is formed by a frame, and the content cannot be displayed in the non-display region, and
the display processor further determines whether the important information is hidden by the frame, and performs display to cause the important information not to be hidden by the frame when determining that the important information is hidden by the frame.

19. The vehicle display program according to claim 18, wherein the display processor further calculates a coordinate of the important information in a virtual space where the important information is displayed, and determines whether the important information is hidden by the frame based on the coordinate of the important information, the head position, the angle, the line of sight, and a coordinate of the non-display region in a real space.

* * * * *